United States Patent
Griffin et al.

(10) Patent No.: US 11,602,841 B2
(45) Date of Patent: Mar. 14, 2023

(54) SYSTEMS AND METHODS FOR REMOTE OPERATING AND/OR MONITORING OF A ROBOT

(71) Applicant: Brain Corporation, San Diego, CA (US)

(72) Inventors: Cody Griffin, San Diego, CA (US); Roger Unwin, San Diego, CA (US); John Black, San Diego, CA (US)

(73) Assignee: Brain Corporation, San Diego, CA (US)

( * ) Notice: Subject to any disclaimer, the term of this patent is extended or adjusted under 35 U.S.C. 154(b) by 20 days.

(21) Appl. No.: 16/939,779

(22) Filed: Jul. 27, 2020

(65) Prior Publication Data

US 2021/0008714 A1     Jan. 14, 2021

Related U.S. Application Data

(63) Continuation of application No. 15/362,544, filed on Nov. 28, 2016, now Pat. No. 10,723,018.

(51) Int. Cl.

| | |
|---|---|
| G05D 1/02 | (2020.01) |
| B25J 9/16 | (2006.01) |
| A47L 9/28 | (2006.01) |
| G05D 1/00 | (2006.01) |
| A47L 11/40 | (2006.01) |

(52) U.S. Cl.
CPC .............. *B25J 9/161* (2013.01); *A47L 9/2852* (2013.01); *A47L 9/2889* (2013.01); *A47L 9/2894* (2013.01); *A47L 11/4011* (2013.01); *G05D 1/0027* (2013.01); *G05D 1/0274* (2013.01); *G05D 1/0282* (2013.01); *A47L 2201/04* (2013.01); *A47L 2201/06* (2013.01); *G05D 2201/0203* (2013.01)

(58) Field of Classification Search
CPC ............ A47L 2201/04; A47L 2201/00; G05D 1/0274; G05D 2201/0215
See application file for complete search history.

(56) References Cited

U.S. PATENT DOCUMENTS

| | | | | |
|---|---|---|---|---|
| 9,465,388 | B1* | 10/2016 | Fairfield | ............... G05D 1/0044 |
| 9,687,983 | B1* | 6/2017 | Prats | ........................ B25J 19/04 |
| 10,102,430 | B2* | 10/2018 | Vunic | ................. G06K 9/00765 |
| 10,807,593 | B1* | 10/2020 | Nave | ...................... B60K 28/14 |
| 2007/0250212 | A1* | 10/2007 | Halloran | ............. A47L 11/4011 700/245 |
| 2009/0326709 | A1* | 12/2009 | Hooper | ................... G06F 16/93 700/245 |

(Continued)

OTHER PUBLICATIONS

Prior parent U.S. Appl. No. 15/362,544, filed Nov. 28, 2016.

*Primary Examiner* — Ryan Rink
(74) *Attorney, Agent, or Firm* — Reed Smith LLP; Sidharth Kapoor

(57) ABSTRACT

Systems and methods for remote operating and/or monitoring of a robot are disclosed. In some exemplary implementations, a robot can be communicatively coupled to a remote network. The remote network can send and receive signals with the robot. In some exemplary implementations, the remote network can receive sensor data from the robot, allowing the remote network to determine the context of the robot. In this way, the remote network can respond to assistance requests and also provide operating commands to the robot.

20 Claims, 12 Drawing Sheets

(56) References Cited

U.S. PATENT DOCUMENTS

| | | | |
|---|---|---|---|
| 2011/0264305 A1* | 10/2011 | Choe | G05D 1/0274 701/2 |
| 2013/0085625 A1* | 4/2013 | Wolfe | G05D 1/0027 701/1 |
| 2014/0207282 A1* | 7/2014 | Angle | G05B 15/02 700/257 |
| 2015/0106010 A1* | 4/2015 | Martin | G08G 1/096741 701/410 |
| 2015/0148949 A1* | 5/2015 | Chin | B05D 1/02 700/245 |
| 2015/0150429 A1* | 6/2015 | Yoo | A47L 11/4061 173/1 |
| 2015/0193982 A1* | 7/2015 | Mihelich | H04L 67/18 345/633 |
| 2015/0321350 A1* | 11/2015 | Mian | B25J 9/16 700/257 |
| 2015/0339570 A1* | 11/2015 | Scheffler | G06N 3/04 706/16 |
| 2016/0023351 A1* | 1/2016 | Kuffner | B25J 9/0084 700/248 |
| 2016/0167226 A1* | 6/2016 | Schnittman | G06T 7/55 901/1 |
| 2016/0180239 A1* | 6/2016 | Frankel | G06V 40/172 706/12 |
| 2016/0189310 A1* | 6/2016 | O'Kane | G06Q 40/08 705/4 |
| 2016/0266577 A1* | 9/2016 | Kerzner | G08B 13/19697 |
| 2016/0282862 A1* | 9/2016 | Duffley | G05D 1/0016 |
| 2016/0374527 A1* | 12/2016 | Yoo | A47L 11/4061 180/209 |
| 2017/0123422 A1* | 5/2017 | Kentley | B60L 15/20 |
| 2017/0225336 A1* | 8/2017 | Deyle | G08B 13/196 |
| 2017/0227647 A1* | 8/2017 | Baik | G01S 7/4802 |
| 2018/0286056 A1* | 10/2018 | Kaino | G06T 7/20 |
| 2019/0019349 A1* | 1/2019 | Dolgov | G07C 5/008 |
| 2019/0090472 A1* | 3/2019 | Crinklaw | A01B 69/008 |
| 2021/0089040 A1* | 3/2021 | Ebrahimi Afrouzi | A47B 9/2894 |

* cited by examiner

Sessions — 752

| Date | Type | Start Time | End Time | Total Duration |
|---|---|---|---|---|
| 12/19/16 | POWER ON | 8:25:49 | 10:27:52 | 2:02:03 |
| | AUTONOMOUS | 8:35:06 | 9:25:10 | 0:50:04 |
| | MANUAL TRAINING | 9:42:25 | 9:56:22 | 0:11:57 |
| 12/14/16 | POWER ON | 8:22:04 | 11:04:23 | 2:42:19 |
| | AUTONOMOUS | 8:25:45 | 10:55:12 | 2:29:27 |
| 12/03/16 | POWER ON | 8:26:19 | 11:32:56 | 3:06:37 |
| | AUTONOMOUS | 8:35:06 | 9:52:33 | 1:17:27 |
| | AUTONOMOUS | 10:05:12 | 10:56:12 | 0:51:00 |
| | MANUAL TRAINING | 11:02:40 | 11:29:41 | 0:27:01 |
| 11/26/16 | POWER ON | 8:22:32 | 11:20:49 | 2:58:17 |
| | MANUAL TRAINING | 8:42:11 | 10:25:32 | 1:43:21 |
| | MANUAL TRAINING | 10:36:47 | 11:05:13 | 0:29:26 |

Total Usage Breakdown — 754

| Power On | Autonomous Usage | Manual Usage |
|---|---|---|
| 21:38:23 | 4:25:09 | 3:08:12 |

Assists — 756

| Frequency | Non-Emergency |
|---|---|
| 2 | 10 |

FIG. 7B

SYSTEMS AND METHODS FOR REMOTE OPERATING AND/OR MONITORING OF A ROBOT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for remote operating and/or monitoring of a robot.

Background

In some cases, robots can operate autonomously with little to no operator control. However, while these robots operate autonomously, robots can run into situations where human assistance may be required. For example, autonomous robots can get stuck and require human assistance. As another example, robots might not be performing at optimal levels and/or need to human adjustment to their protocols. As another example, robots may not be configured to perform certain tasks and/or make certain adjustments, and additional input and/or control for the robot may be necessary.

Contemporary robots frequently work in controlled environments with little connectivity and remote monitoring. Accordingly, operators assist these robots onsite, which in some cases causes unnecessary down time for these robots. This contemporary scenario can also be expensive to maintain, as people are often required to be present onsite to watch these robots and/or divert them from other tasks in order to assist a robot. Accordingly, there is a need for improved systems and methods for operating and/or monitoring of a robot.

SUMMARY

The foregoing needs are satisfied by the present disclosure, which provides for, inter alia, apparatus and methods for dynamic route planning in autonomous navigation. Example implementations described herein have innovative features, no single one of which is indispensable or solely responsible for their desirable attributes. Without limiting the scope of the claims, some of the advantageous features will now be summarized.

In a first aspect, a robotic system is disclosed. In one exemplary implementation, the robotic system includes a robot comprising: one or more sensors configured to generate sensor data about an environment, and a robot communications unit configured to send the sensor data and a request for assistance. The robotic system also includes a remote network comprising: a remote network communications unit configured to receive the sensor data and the request for assistance from the robot, and a processor configured to: identify an event of interest in the sensor data, the event of interest occurring at a first time; determine a window of time having a beginning time prior to the first time and an end time after the first time; determine a context based at least in part on the sensor data for the determined window of time; and send to the robot communications unit, using the remote network communications unit, instructions to address the request for assistance based at least in part on the determined context.

In one variant, the one or more sensors of the robot are further configured to generate map related data about the environment; the remote network communications unit is configured to receive the map related data from the robot; and the remote network further comprises a map processing unit configured to generate a map of the environment based at least in part on the map related data, wherein the remote network communications unit is further configured to send the map generated by the map processing unit to the robot for autonomous navigation.

In another variant, the robot is a floor cleaner. In another variant, the instructions to address the request for assistance comprise actuator instructions that are configured to cause the robot to actuate. In another variant, the remote network further comprises a user interface configured to receive a user input, wherein the instructions to address the request for assistance are generated based at least in part on the user input. In another variant, the robot is configured to navigate the environment autonomously; and the event of interest in the sensor data comprises an obstruction along a route of the robot.

In another variant, the robotic system a second robot having a second robot communications unit communicatively coupled to the remote network. In another variant, the remote network is further configured to track usage of the robot. In another variant, the one or more sensors includes a light detection and ranging sensor.

In a second aspect, a robot is disclosed. In one exemplary implementation, the robot includes: one or more sensors configured to generate sensor data about an environment; an actuator configured to perform a task; and a processor configured to: detect an obstacle in the environment based at least in part on the sensor data; determine that the robot cannot perform the task, and in response to the determination, prevent the actuator from performing the task; send the sensor data and a request for assistance to a remote network in response to the determination; receive an instruction from the remote network to perform the task in response to the request for assistance; and perform the task based at least in part on the instruction from the remote network.

In one variant, the robot is a floor cleaner and the task comprises cleaning a floor. In another variant, the processor is further configured to: determine a window of time having (1) a beginning time prior to the detection of the obstacle and (2) an end time after the detection of the obstacle; and send the sensor data corresponding to the determined window of time.

In another variant, the processor is further configured to receive a map from the remote network and perform the task based at least in part on the received map.

In another variant, the robot further comprises a mapping and localization unit configured to generate a map based at least in part on the generated sensor data.

In another variant, the processor is further configured to send the map to the remote network and receive a corrected map from the remote network, the sent map having one or more errors and the corrected map no longer having the one or more errors.

In another variant, the one or more sensors, the actuator, and the processor comprise an attachable module.

In a third aspect, a remote network is disclosed. In one exemplary implementation, the remote network comprises: a communications unit configured to receive sensor data and a request for assistance from a robot; and a processor configured to: identify an event of interest in the received sensor data, determine a context based at least in part on the received sensor data, and send to the robot, using the communications unit, instructions to address the request for assistance based at least in part on the determined context.

In one variant, the sensor data comprises a window of data having (1) a beginning time prior to the event of interest and (2) an end time after the event of interest; and the determination of the context is based at least in part on the window of data.

In another variant, the remote network further comprises a user interface configured to display the context and receive the instructions to address the request for assistance from a user.

In another variant, the determination of the context further comprises machine learning performed on a library of stored sensor data.

In another variant, the remote network is communicatively coupled to a plurality of robots via the communications unit.

In a fourth aspect, a method for operation of a remote network is disclosed. In one exemplary implementation, the method includes: identifying an event of interest in sensor data, the event of interest occurring at a first time; determining a window of time having a beginning time prior to the first time and an end time after the first time; determining a context based at least in part on the sensor data generated during the window; and sending to a robot instructions to address the request for assistance based at least in part on the context.

In a fifth aspect, a method for operation of a robot is disclosed. In one exemplary implementation, the method includes detecting an obstacle in the environment based at least in part on sensor data and determine that the robot cannot perform a task; preventing an actuator of the robot from performing the task; sending the sensor data and a request for assistance to a remote network; receiving an instruction from the remote network to perform the task; and performing the task based at least in part on the instructions from the remote network.

In a sixth aspect, a non-transitory computer-readable storage apparatus is disclosed. In one exemplary implementation, the non-transitory computer-readable storage apparatus has a plurality of instructions stored thereon, the instructions being executable by a processing apparatus for operating a remote network. The instructions are configured to, when executed by the processing apparatus, cause the processing apparatus to: identify an event of interest in sensor data, the event of interest occurring at a first time; determine a window of time having a beginning time prior to the first time and an end time after the first time; determine a context based at least in part on the sensor data generated during the window; and send to a robot instructions to address the request for assistance based at least in part on the context.

In some implementations, the non-transitory computer-readable storage apparatus has a plurality of instructions stored thereon, the instructions being executable by a processing apparatus for operating a robot. The instructions are configured to, when executed by the processing apparatus, cause the processing apparatus to: detect an obstacle in the environment based at least in part on sensor data and determine that the robot cannot perform a task; prevent an actuator of the robot from performing the task; send the sensor data and a request for assistance to a remote network; receive an instruction from the remote network to perform the task; and perform the task based at least in part on the instructions from the remote network.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 7B includes a reporting page summarizing usage of a robot in accordance with some implementations of this disclosure.

Figure 1A:
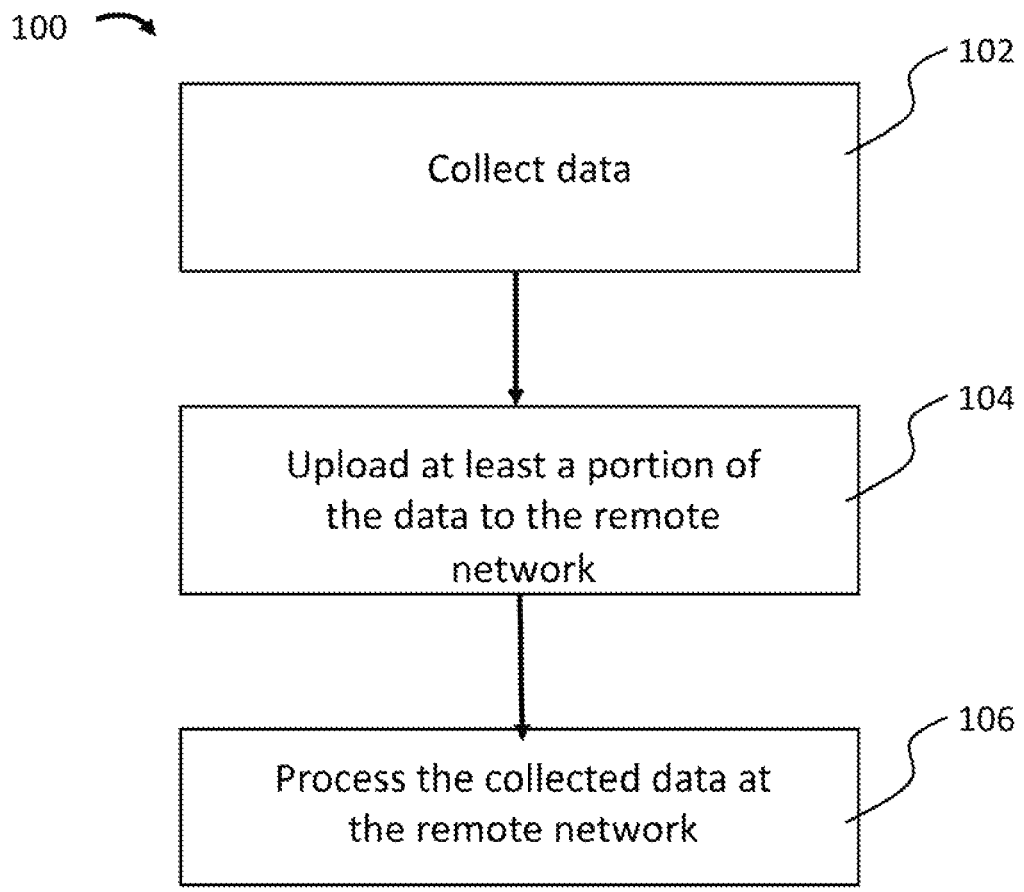
FIG. 1A is a process flow diagram of an exemplary method for operation of a robot in accordance with some implementations of this disclosure.

All Figures disclosed herein are ©Copyright 2016 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved remote operating and/or monitoring of a robot. As used herein, a robot can include mechanical or virtual entities configured to carry out complex series of actions automatically. In some cases, robots can be machines that are guided and/or instructed by computer programs or electronic circuitry. In some cases, robots can include electro-mechanical components that are configured for navigation, where the robot can move from one location to another. Such navigating robots can include autonomous and/or self-driving cars, floor cleaners, rovers, drones, planes, boats, carts, and the like.

In some cases, robots can include appliances, machines, and/or equipment automated to perform one or more tasks. For example, a module can be attached to the appliances, machines, and/or equipment to allow them to operate autonomously. In some implementations, the module can include a motor that drives the autonomous motions of the appliances, machines, and/or equipment. In some cases, the module causes the appliances, machines, and/or equipment to operate based at least in part on spoofing. The module can include sensors and/or processors to receive and generate data. Such appliances, machines, and/or equipment can include such as forklifts, tugs, boats, planes, industrial equipment, floor cleaners, home appliances, etc.

As referred to herein, floor cleaners can include floor cleaners that are manually controlled (e.g., driven or remote controlled) and/or autonomous (e.g., using little to no user control). For example, floor cleaners can include floor scrubbers that a janitor, custodian, or other person operates and/or robotic floor scrubbers that autonomously navigate and/or clean an environment. Similarly, floor cleaners can also include vacuums, steamers, buffers, mops, polishers, sweepers, burnishers, etc.

Detailed descriptions of the various implementations and variants of the system and methods of the disclosure are now provided. While many examples discussed herein are in the context of robotic floor cleaners, it will be appreciated that the described systems and methods contained herein can be used in other robots. Myriad other example implementations or uses for the technology described herein would be readily envisaged by those having ordinary skill in the art, given the contents of the present disclosure.

Advantageously, the systems and methods of this disclosure at least: (i) enable data transfer to/from robots; (ii) allow for robot optimization; (iii) enable remote robot assistance; (iv) allow robots to safely operate in environments even in unforeseen circumstances; (v) allow control of a plurality of robots; (vi) allow for remote monitoring of robot statuses, maintenance, and/or performance; (vii) provide data security for robot data; (viii) allow for review of robot mapping and/or performance; and (ix) provide for computationally efficient management of robot and/or robot data. Other advantages are readily discernable by one having ordinary skill in the art given the contents of the present disclosure.

For example, a robot can navigate an environment, collecting data and/or performing actions. By way of illustration, the robot can be a floor cleaner that cleans a floor as it navigates an environment. The robot can collect and/or generate data. For example, the robot can have sensors that sense the environment of the robot, as will be later described in this disclosure with reference to FIG. 2. These sensors can produce data about the environment. The robot can also have sensors that monitor the performance of the robot, such as on/off time, speed, statuses, software version, operation (e.g., performing actions/operations, such as cleaning), maintenance, etc. These sensors can produce data about the robot. The robot can also generate map related data (e.g., data related to and/or that can be used for mapping and/or localization) containing information about the robot's environment and/or route that allow the robot to autonomously navigate an environment.

In these situations, systems and methods of this disclosure can be desirable for an external review of the data collected and/or generated by the robot. This external review can allow any errors or malfunctions of the robot to be reviewed and, potentially, found and resolved. For example, a remote operator (e.g., a user and/or computer) can review the data to assess any needs of the robot and/or improve the performance of the robot. The remote monitor can review maps and/or evaluate their accuracy. If a map is inaccurate, map correction and/or other procedures can be performed remotely. Advantageously, the remote monitor can provide an additional layer of safety and/or accuracy to the robot, catching and/or correcting errors as desired.

As another example, the remote operator can provide instructions for the robot when it is stuck (e.g., cannot navigate out of and/or through a space). The remote operator can dynamically reroute the robot. Advantageously, having remote monitoring and/or interaction with a robot in accordance with implementations of this disclosure can allow robots to navigate in more challenging environments. This can allow the deployment of robots that may not be programmed to handle all situations that can arise. For example, robots that are configured to learn environments and/or actions may not know an environment and/or action initially. The remote operator can assist the robot until it sufficiently learns an environment and/or action. As another example, a robot can encounter a situation that has not been addressed by the robot's programming (e.g., a corner case, uncontemplated scenario, and/or any scenario unaccounted for). The remote operator can then provide a solution to the robot. In some cases, a programming solution can later be loaded onto the robot so that assistance from the remote operator is no longer necessary.

As another example, robots can be configured with a variety of parameters and tolerances. There can be a perception by people (e.g., users, observers, etc.) that robots that stop are malfunctioning. Thus, there can be a tendency for programmers to push the limits of the robots to avoid them from having down time. Systems and methods of this disclosure can allow programmers to error on the side of safety by having robots stop in more situations. Because a remote operator can quickly assist the robot, the down time can be substantially minimized. In such cases, the appearance of assistance by an observer of a robot can be substantially minimized, producing the appearance of substantially seamless autonomy. This positive outlook of autonomy can be reassuring to people, further enhancing their trust in the robot.

As another example, robot performance is often difficult to evaluate. People may observe a robot for periods of time, but then may just assume the robot is doing its job correctly. Indeed, spending too much time observing the robot may eviscerate any potential savings of reallocating manual operator's time to other tasks. Systems and methods of this disclosure allow reporting that can be indicative at least in part of the performance of the robot. With knowledge of the performance of the robot, operators can improve robot performance and/or evaluate the usefulness of the robot.

As another example, the systems and methods of this disclosure provide cost-effective solutions for robot monitoring and/or operation. Though monitoring and control can potentially add costs and overhead for a robot, one remote network can operate and/or monitor a plurality of robots, allowing for shared resources. In this way, the cost can be distributed over a plurality of robots, reducing the cost of monitoring and/or operating any one. Moreover, the remote network can provide additional opportunity for efficiency and cost-sharing. The remote network can implement hardware that is more advanced and costly than any individual robot. Instead of having advanced hardware on each robot, the hardware can be shared between the robots at the remote network. The remote network can then be used for costlier and/or more hardware-intensive computations (e.g., such as machine learning, image processing, and/or other methods). Advantageously, the hardware of the remote network can constantly be upgraded, whereas it can be difficult to upgrade the hardware of individual robots after those robots have been deployed.

FIG. 1A is a process flow diagram of an exemplary method 100 for operation of a robot in accordance with some implementations of this disclosure. Block 102 includes collecting data. For example, a robot can collect data through its sensors, such as sensors of sensors unit 212 as will be described with reference to FIG. 2. This data can include raw data from the sensors. This data can also include, in addition or in the alternative, aggregated and/or conclusions drawn from data, including statuses, operating times, reports, etc. In some cases, data can also include maps and/or routes for the robot to travel. The maps can include maps of an environment of the robot, such as objects, obstacles, and/or other features in the surroundings of the robot. Routes can include paths in which the robot travels in the environment. Routes can be prospective, such as the path a robot will travel in an environment. Routes can also be retrospective, such as the path a robot has travelled previously. Routes can also include the current positions and/or poses of the robot.

In some cases, such data can be stored locally on the robot, such as in memory 202 as will be described with reference to FIG. 2. This data can be stored temporarily and/or for a length of time as desired.

Block 104 includes uploading at least a portion of the data to the remote network. Such uploading can occur at predetermined time intervals and/or on demand. For example, the robot can push data to the remote network. The robot can initiate such a transfer of data based at least in part on a schedule, an event (e.g., collection of certain types of data), and/or as initiated on a user interface of the robot. As another example, the remote network can pull data from the robot. The remote network can initiate such a transfer of data based at least in part on a schedule, an event (e.g., collection of certain types of data), and/or as initiated on a user interface of the remote network.

Block 106 includes processing the collected data at the remote network. As will be described further in this disclosure, such data processing can include aggregating data, generating reports, error correction, responding to the data, etc.

Figure 1B:
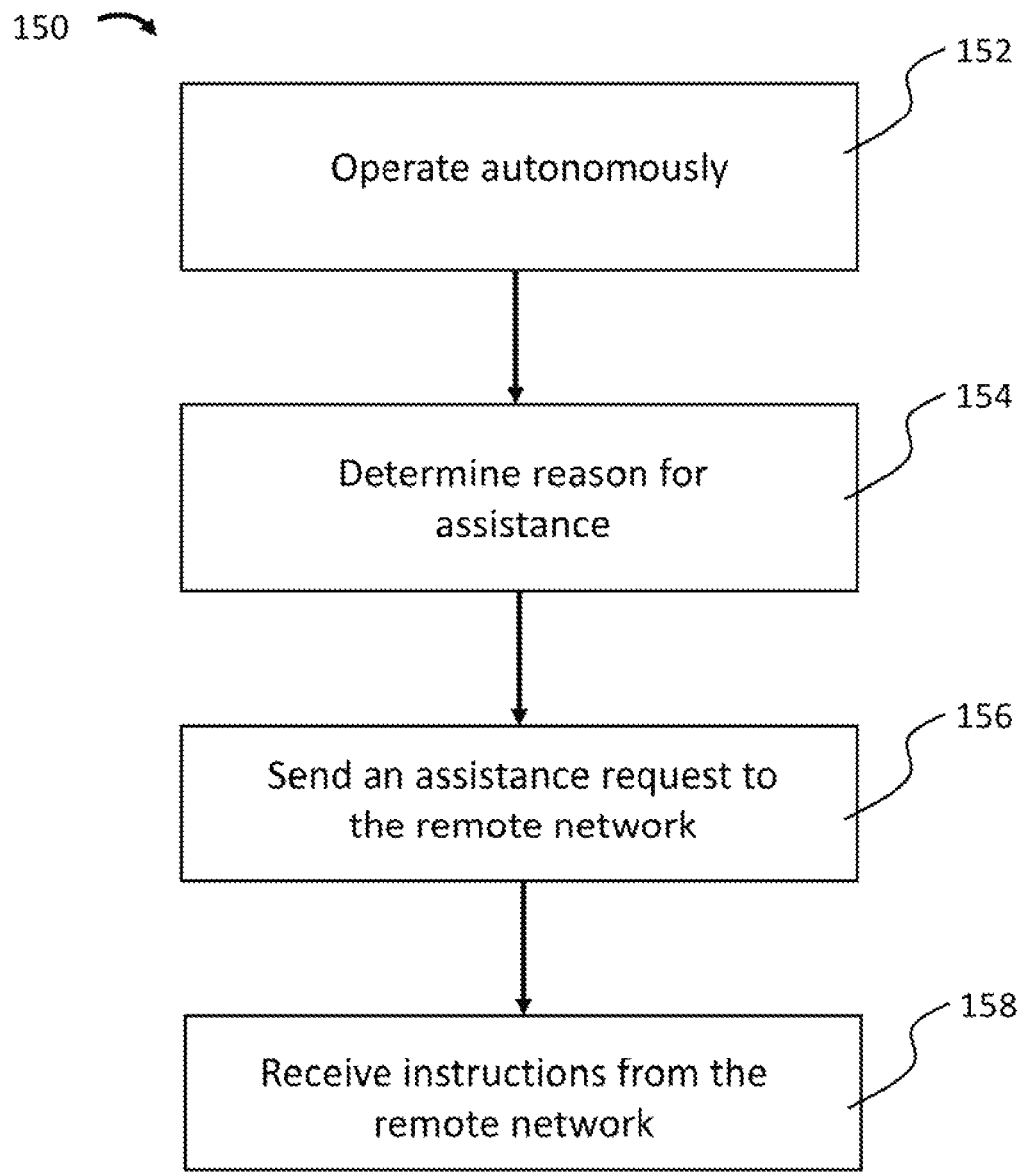
FIG. 1B is a process flow diagram of an exemplary method for operation of a robot to receive assistance in accordance with some implementations of this disclosure.

FIG. 1B is a process flow diagram of an exemplary method 150 for operation of a robot to receive assistance in accordance with some implementations of this disclosure. Block 152 includes operating autonomously. Autonomous operation can include autonomous navigation and/or any performance of any action by a robot with little to no user control.

Block 154 includes determining a reason for assistance. For example, in the course of autonomous operation, a robot can find itself in situations where assistance can be desired. For example, a robot's path can be obstructed such that the robot does not have a path to travel in accordance to the robot's programming. The robot can then determine that assistance to clear its path (e.g., having a person move the obstacles) would be desirable. As another example, a robot can have a malfunction (e.g., in the case of floor cleaners, brushes could break, tanks burst, water leak, etc.). Accordingly, the robot may not be able to go forward with a task it was to perform autonomously, and can determine that assistance to fix the problem is desirable. As another example, the robot can have maintenance issues, such as maintenance of fluids, belts, pads, squeegees, brushes, batteries, consumables, etc. Accordingly, the robot can determine that maintenance is desired.

As another example, a robot can approach a predetermined scenario where the robot determines that assistance is desirable. By way of illustration, a robot can have a predefined footprint. The footprint can provide a predetermined amount of clearance, which can be the amount of space between the robot and an object in the environment as the robot navigates (e.g., if the width of a robot is 21 inches, the clearance can be 25 inches to create clearance space). If a passage is smaller than the footprint, a robot can determine assistance is desired. Any other scenario can be predefined. As another illustration, a robot can be programmed to determine assistance is desirable if an object appears as an obstruction and then disappears in the sensors of the robot. Such a scenario can create an uncertainty of whether there is a person, child, and/or animal around, and the robot can determine assistance is desirable to see how the robot should proceed. As another example, a robot can have an error (e.g., causes known or unknown) and determine assistance is desired.

After determining a reason for assistance in Block 154, the robot can then send an assistance request. Block 156 includes sending an assistance request to the remote network. Such an assistance request can include statuses, data, alerts, commands, and/or other signals. As will be described in this disclosure, the assistance request can be sent using communications unit 222, illustrated in FIG. 2.

The assistance request can be received by the remote network and/or processed (e.g., by a computer and/or person). The remote network can then send back instructions to the robot. Block 158 includes receiving instructions from the remote network. These instructions can include: wait for assistance (e.g., from an operator), stop, proceed, and/or any further action by the robot and/or an operator.

Figure 2:
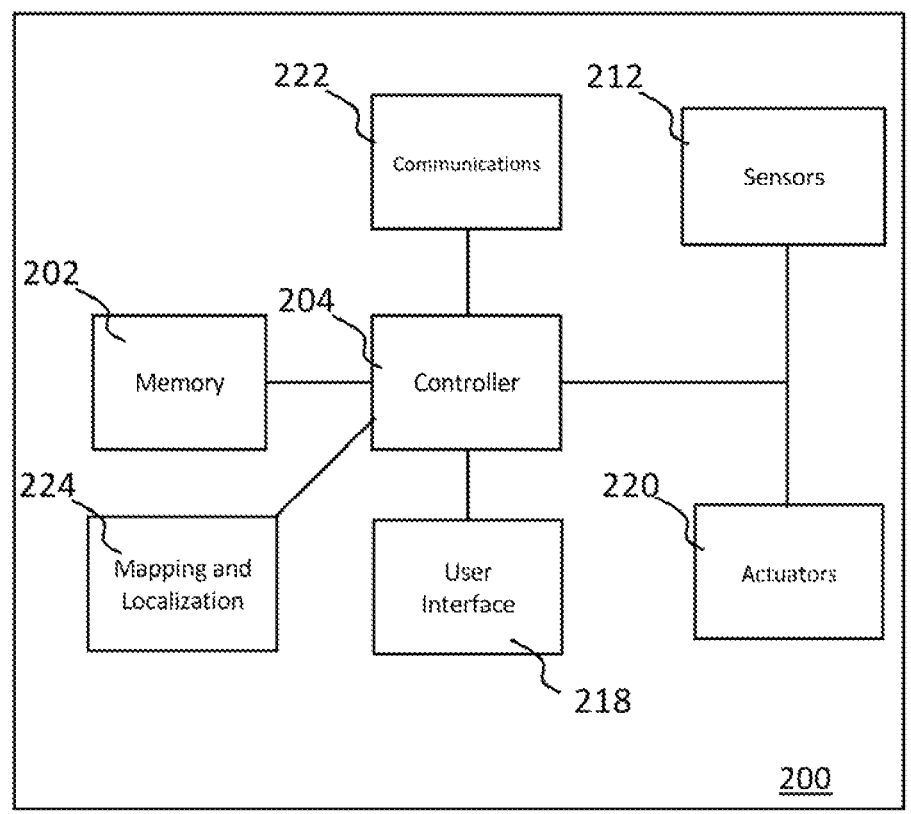
FIG. 2 is a functional block diagram of a robot in accordance with some principles of this disclosure.

FIG. 2 is a functional block diagram of a robot 200 in accordance with some principles of this disclosure. As illustrated in FIG. 2, robot 200 can include controller 204, memory 202, user interface unit 218, mapping and localization unit 224, sensors unit 212, and communications unit 222, as well as other components and subcomponents (e.g., some of which may not be illustrated). Although a specific implementation is illustrated in FIG. 2, it is appreciated that the architecture can be varied in certain implementations as would be readily apparent to one of ordinary skill given the contents of the present disclosure. As used herein, robot 200 can be representative at least in part of any robot described in this disclosure (e.g., robots 200A-200C). Any functionality, systems, and/or methods described with reference to robot 200 can be applied substantially similarly to any one of robots 200A-200C (and/or any other robot described in this disclosure) and vice versa.

Controller 204 can control the various operations performed by robot 200. Controller 204 can include one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors can be contained on a single unitary integrated circuit die, or distributed across multiple components.

Controller 204 can be operatively and/or communicatively coupled to memory 202. Memory 202 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 202 can provide instructions and data to controller 204. For example, memory 202 can be a non-transitory, computer-readable storage medium having a plurality of instructions stored thereon, the instructions being executable by a processing apparatus (e.g., controller 204) to operate robot 200. In some cases, the instructions can be configured to, when executed by the processing apparatus, cause the processing apparatus to perform the various methods, features, and/or functionality described in this disclosure. Accordingly, controller 204 can perform logical and arithmetic operations based on program instructions stored within memory 202.

In some implementations, sensors unit 212 can comprise systems and/or methods that can detect characteristics within and/or around robot 200. Sensors unit 212 can comprise a plurality and/or a combination of sensors. Sensors unit 212 can include sensors that are internal to robot 200 or external, and/or have components that are partially internal and/or partially external. In some cases, sensors unit 212 can include one or more exteroceptive sensors, such as sonars, light detection and ranging ("LIDAR") sensors, radars, lasers, cameras (including video cameras, infrared cameras, 3D cameras, thermal cameras, etc.), time of flight ("TOF") cameras, antennas, microphones, and/or any other sensor known in the art. In some implementations, sensors unit 212 can collect raw measurements (e.g., currents, voltages, resistances, gate logic, etc.) and/or transformed measurements (e.g., distances, angles, detected points in obstacles, etc.). In some cases, measurements can be aggregated and/or summarized. Sensors unit 212 can generate data based at least in part on measurements. Such data can be stored in data structures, such as matrices, arrays, etc. In some implementations, the data structure of the sensor data can be called an image.

In some implementations, sensors unit 212 can include sensors that can measure internal characteristics of robot 200. For example, sensors unit 212 can measure temperature, power levels, statuses, and/or any other characteristic of robot 200. In some cases, sensors unit 212 can be configured to determine the odometry of robot 200. For example, sensors unit 212 can include proprioceptive sensors, which can comprise sensors such as accelerometers, inertial measurement units ("IMU"), odometers, gyroscopes, speedometers, cameras (e.g. using visual odometry), clock/timer, and the like. Odometry can facilitate autonomous navigation and/or other autonomous actions of robot 200. This odometry can include robot 200's position (e.g., where position can include robot's location, displacement and/or orientation, and can sometimes be interchangeable with the term pose as used herein) relative to the initial location. Such data can be stored in data structures, such as matrices, arrays, etc. Data structures can include queues, lists, arrays, stacks, bags, etc. In some implementations, the data structure of the sensor data can be called an image.

Mapping and localization unit 224 can receive sensor data from sensors unit 212 to localize robot 200 in a map. In some implementations, mapping and localization unit 224 can include localization systems and methods that allow robot 200 to localize itself in the coordinates of a map and/or relative to a location (e.g., an initialization location, end location, beacon, reference point, etc.). Mapping and localization unit 224 can also process measurements taken by robot 200, such as by generating a graph and/or map.

In some implementations, user interface unit 218 can be configured to enable a user to interact with robot 200. For example, user interface unit 218 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. User interface units 218 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In some implementations user interface unit 218 can be positioned on the body of robot 200. In some implementations, user interface unit 218 can be positioned away from the body of robot 200, but can be communicatively coupled to robot 200 (e.g., via communication units including transmitters, receivers, and/or transceivers) directly or indirectly (e.g., through a network, server, and/or a cloud).

In some implementations, communications unit 222 can include one or more receivers, transmitters, and/or transceivers. Communications unit 222 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Communications unit 222 can also be configured to send/receive utilizing a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communications unit 222 to communicate to external systems, such as computers, smart phones, tablets, data capture systems, mobile telecommunications networks, clouds, servers, or the like. Communications unit 222 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 222 can be configured to send and receive statuses, commands, and other data/information. For example, communications unit 222 can communicate with a user operator to allow the user to control robot 200. Communications unit 222 can communicate with a server/network (e.g., a remote network) in order to allow robot 200 to send data, statuses, commands, and other communications to the server. The server can also be communicatively coupled to computer(s) and/or device(s) that can be used to monitor and/or control robot 200 remotely. Communications unit 222 can also receive updates (e.g., firmware or data updates), data, statuses, commands, and other communications from a server for robot 200.

Actuators 220 can include any system used for actuating, in some cases to perform tasks. For example, actuators 220 can include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. In some implementations, actuators 220 can include systems that allow movement of robot 200, such as motorize propulsion. For example, motorized propulsion can move robot 200 in a forward or backward direction, and/or be used at least in part in turning robot 200 (e.g., left, right, and/or any other direction). By way of illustration, actuators 220 can control if robot 200 is moving or is stopped and/or allow robot 200 to navigate from one location to another location. Actuators 220 can also be configured to actuate other instruments of robot 200, such as turning on/off water, turning on/off brushes, spraying water, turning on/off vacuums, moving vacuum hose positions, moving appendages (e.g., robotic arms, legs, hands, feet, etc.), and/or any other action.

The one or more of the units described with respect to FIG. 2 (including memory 202, controller 204, sensors unit 212, user interface unit 218, actuators unit 220, communications unit 222, mapping and localization unit 224, and/or other units) can be integrated onto robot 200, such as in an integrated system. However, in some implementations, one or more of these units can be part of an attachable module. This module can be attached to an existing apparatus to automate so that it behaves as a robot. Accordingly, the features described in this disclosure with reference to robot 200 can be instantiated in a module that can be attached to an existing apparatus and/or integrated onto robot 200 in an integrated system.

Figure 3A:
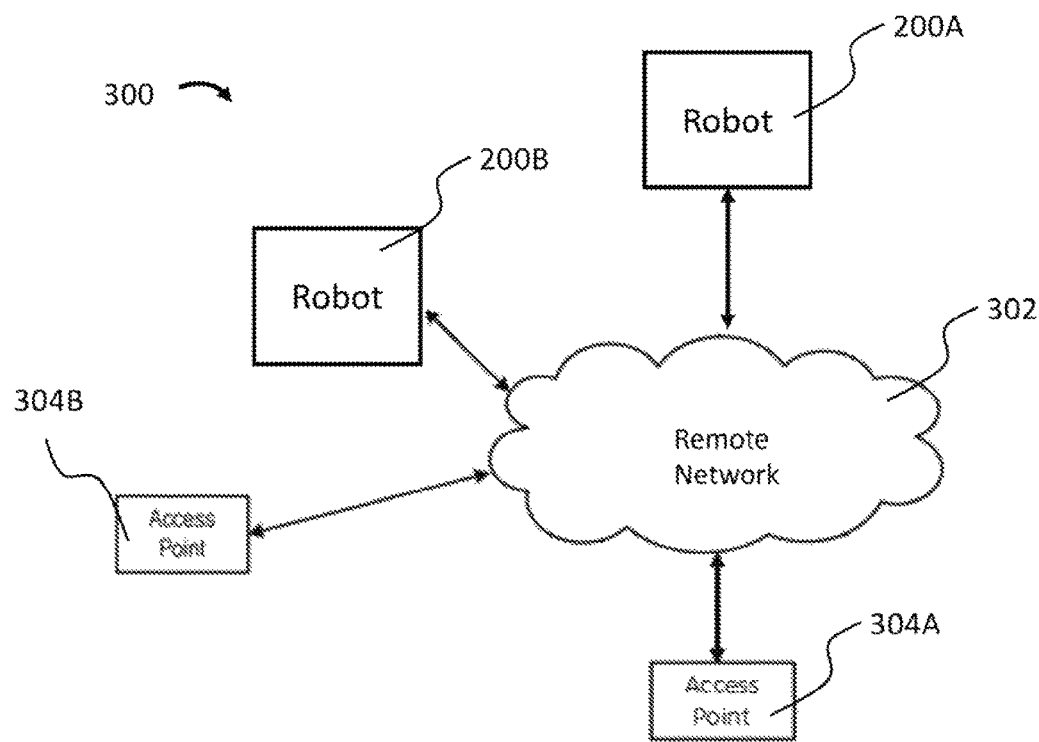
FIG. 3A is a functional block diagram of system, which includes a plurality of robots communicatively and/or operatively coupled to a remote network in accordance with some implementations of this disclosure.

In some implementations, robot 200 can be communicatively coupled to a remote network. FIG. 3A is a functional block diagram of system 300, which includes a plurality of robots 200A and 200B communicatively and/or operatively coupled to remote network 302 in accordance with some implementations of this disclosure. Remote network 302 can comprise a collection of hardware, software, services, and/or resources that can be invoked to instantiate a virtual machine, process, or other resource for a limited or defined duration, or an unlimited or undefined duration. Remote network 302 can be communicatively and/or operatively coupled to a plurality of devices, systems, and/or servers, including devices and/or servers that have access to the internet. One or more of access points, such as Access Points 304A and 304B, can be devices, systems, and/or servers, including, but not limited to, computers, mobile devices, tablets, smart phones, cells phones, personal digital assistants, phablets, e-readers, smart watches, set-top boxes, internet streaming devices, gaming consoles, smart appliances, and/or any device with access to the internet and/or any network protocol. Although two access points are illustrated there can be more or fewer access points as desired.

As used herein, remote network 302 can be operated. Remote network 302 can have onboard computers that can receive, process, and/or send information. These computers can operate autonomously and/or under control by a human operator. Similarly, remote network 302 can have access points (e.g., Access Points 304A and 304B), which can similarly be used to operate remote network 302. The access points can have computers and/or human operators that can receive, process, and/or send information. Accordingly, references herein to operation of remote network 302 can be applied to a human operator and/or a computer operator.

In some implementations, one or more robots that are substantially similar to robot 200 can be communicatively and/or operatively coupled to remote network 302. For example, robot 200A and robot 200B are illustrated as communicatively coupled to remote network 302 using communications unit substantially similar to communications unit 222. Each of robots 200A and 200B can communicates statuses, commands, and operative data to remote network 302. Remote network 302 can also store and/or communicate statuses, commands, and/or operative data to one or more of robots 200A and 200B.

Figure 3B:
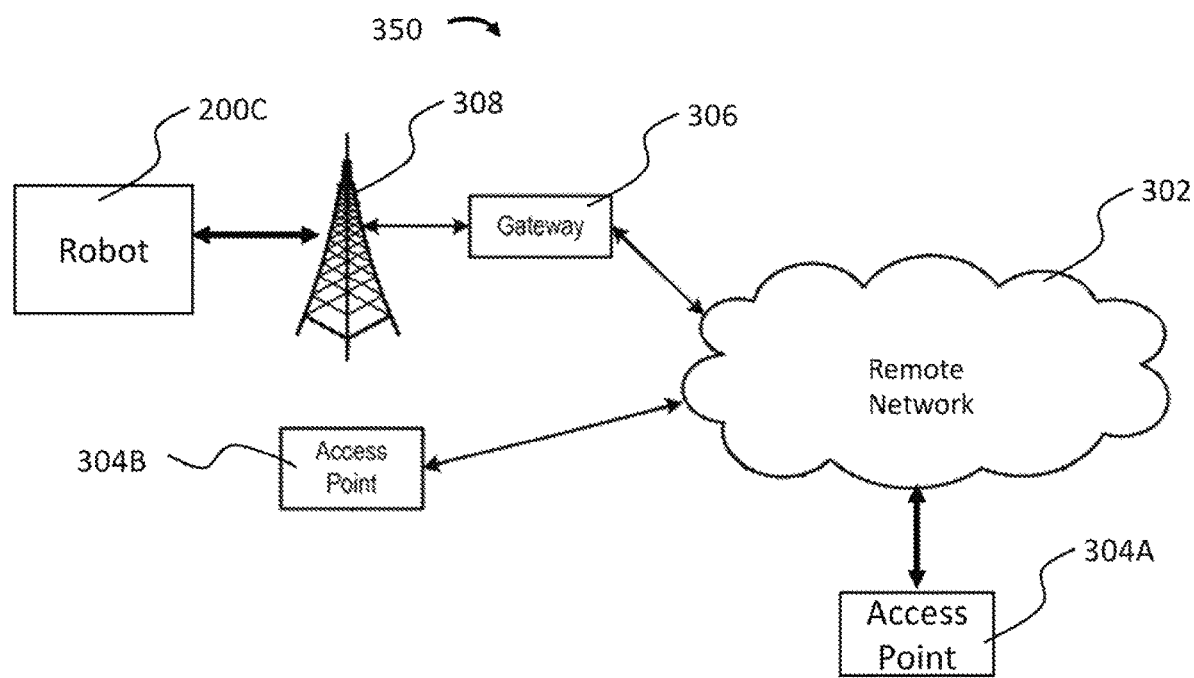
FIG. 3B is a functional block diagram of a system, which includes a robot communicatively and/or operatively coupled to a remote network through a gateway in accordance with some implementations of the present disclosure.

FIG. 3B is a functional block diagram of system 350, which includes robot 200C communicatively and/or operatively coupled to remote network 302 through a gateway 306 in accordance with some implementations of the present disclosure. Robot 200C can be substantially similar to robot 200. In some implementations, robot 200C can communicate to remote network 302 directly through the interne and/or any communication protocol described in this disclosure. However, in some implementations, robot 200C can communicate with remote network 302 through an intermediary switch and/or gateway, such as a cellphone tower, router, server, Internet Protocol ("IP") gateway, phone station, and/or any other hardware for routing communication. By way of illustration, tower 308 is a cell phone tower. Robot 200C can communicate to tower 308 through cellular data, which can then pass the data through gateway 306 to remote network 302.

In some implementations, remote network 302 can include memory. The memory can include any type of integrated circuit or other storage device configured to store digital data including, without limitation, ROM, RAM, NVRAM, PROM, EEPROM, DRAM, Mobile DRAM, SDRAM, DDR/2 SDRAM, EDO RAM, FPM, RLDRAM, static RAM SRAM, flash memory (e.g., NAND/NOR), memristor memory, PSRAM, etc. The memory can provide instructions and data to a controller of remote network 302. For example, the memory can be a non-transitory, computer-readable storage medium having a plurality of instructions stored thereon, the instructions being executable by a processing apparatus to operate remote network 302. In some cases, the instructions can be configured to, when executed by the processing apparatus, cause the processing apparatus to perform the various methods, features, and/or functionality described in this disclosure. Accordingly, a controller of remote network 302 can perform logical and/or arithmetic operations based on program instructions stored within the memory.

The controller of remote network 302 can control the various operations performed by remote network 302. The controller can include one or more processors (e.g., microprocessors) and other peripherals. Such digital processors can be contained on a single unitary integrated circuit die, or distributed across multiple components.

In some implementations, remote network 302 can store a searchable database in memory. Remote network 302 can also store status information indicative of the status of a robot, e.g., robot 200, robot 200A, robot 200B, robot 200C, and/or any other robot, in memory. For example, status information can include: power usage; usage of any and/or each of the modules of robot 200; what operative modules and/or components are present in robot 200; make and version of robot 200 and/or the software of robot 200; the location of robot 200 (e.g., the address and/or the location in a building); historical information (e.g., usage history) of operative modules and other components of robot 200; the health status (e.g., functional, abnormalities, non-functional, need of repair, etc.) of operative modules and components; error diagnoses; software versions and updates; communications between robot 200 (and/or a user of robot 200) and the remote network; sensor data; communications; and/or any relevant information about robot 200.

Remote network 302 can receive status updates from robot 200, which it can use to update stored status information. This status information can be stored in the form of a database, table, form, array, matrix, and/or any data structure or form. In some cases, robot 200 can send status updates to remote network 302. Such updates can occur when an event occurs in robot 200 where information is updated. Robot 200 can also send periodic updates, such as every second, minute, hour, day, week, year, or any unit of time desirable. Remote network 302 can also send a status inquiry signal to robot 200 to receive a status update. A user, such as a user using access points 304A and 304B or at robot 200, can also at least in part cause robot 200 to send a status update to remote network 302. In some embodiments access points 304A and 304B and/or robot 200 can access the information stored in remote network 302, where it can be viewed in a user interface.

Calibration protocols can be initiated by robot 200 (e.g., by a controller or user interface), remote network 302, one or more access points 304A and 304B, and/or any user interface. Calibration protocols can include adjusting readings and/or outputs of sensors, security devices, transceivers, trackers, cameras, power controls, user interfaces, and/or any operational module and/or component of robot 200. In some cases, one or more operational modules and/or components can read the same parameter. For example, a thermometer and a thermal camera can read temperature. In such cases, measurements by the plurality of operational modules and/or components can be compared. For example, present readings and/or past readings stored in memory can be compared to see if there are any differences. In the case where there are differences, an alert can be sent from remote network 302, robot 200, and/or access points 304A and/or 304B. The operational modules and/or components can be recalibrated using a known measurement (e.g., that is held by a user/operator, remote network 302, access points 304A and/or 304B, and/or by robot 200). In some cases, a user can physically go to robot 200 to bring a known measurement and/or run a calibration sequence. In other cases, robot 200 already has known measurements in the form of control sequences and/or control measurements/units. The calibration sequence can include measuring the known measurement and then adjusting readings by the one or more sensors to reflect the known measurement if such readings do not align with the known measurement.

The access points (e.g., access points 304A and 304B) can communicate to remote network 302 through a communication protocol such as Bluetooth, zigbee, Wi-Fi, induction wireless data transmission, radio frequencies, RFID, NFC, GSM, infrared, and/or any other form of wireless data transmission. The access points can also communicate to remote network 302 through a wired connection such as a cable comprising a signal line and ground (e.g., coaxial cable, USB, Ethernet cable, firewire, micro USB, and/or other cables known in the art). The access points can receive and/or send any information or commands described in this disclosure. Advantageously, having an access point communicate directly to remote network 302 can allow the access point to communicate without a network. However, in some cases, access points can communicate through an intermediary switch and/or gateway, such as a cellphone tower, router, server, IP gateway, phone station, and/or any other hardware for routing communication. For example, such intermediary switches and/or gateways can be substantially similar to tower 308 and/or gateway 306.

In some cases, remote network 302 can have a user interface unit. The user interface unit can display information for evaluation by a user. Such information can include data, statuses, communications, conclusions based on the aforementioned, and/or any other information desired. The user interface unit can include touch panels, buttons, keypads/keyboards, ports (e.g., USB, DVI, Display Port, E-Sata, Firewire, PS/2, Serial, VGA, SCSI, audioport, HDMI, PCMCIA ports, memory card ports (e.g., SD and miniSD), and/or ports for computer-readable medium), mice, rollerballs, consoles, vibrators, audio transducers, and/or any interface for a user to input and/or receive data and/or commands, whether coupled wirelessly or through wires. The user interface unit can include a display, such as, without limitation, LCDs, LED displays, LED LCD displays, in-plane-switching IPS displays, cathode ray tubes, plasma displays, HD panels, 4K displays, retina displays, organic LED displays, touchscreens, surfaces, canvases, and/or any displays, televisions, monitors, panels, and/or devices known in the art for visual presentation. In some implementations, the user interface unit can be positioned within the remote network, such as a screen on the hardware of the computers of remote network 302. In some implementations, user interface unit can be communicatively coupled to remote network 302 (e.g., via communication units including transmitters, receivers, and/or transceivers) directly or indirectly (e.g., through a network, server, and/or a cloud). For example, the user interface unit can be on an access point (e.g., access points 304A and/or 304B). As used herein, a user operator of remote network 302 can utilize the user interface unit to operate remote network 302.

In some implementations, robots can communicate with each other through transmission protocols used by transceivers associated with the robots. Such communication can allow multiple robots to coordinate. Such communication can be through a network (e.g., remote network 302) and/or peer-to-peer. These communications can allow robots to coordinate with each other (e.g., cover different portions of a task and/or avoid collisions/interference).

In some implementations, where a person has multiple robots, remote network 302 can coordinate one or more of those robots. Advantageously, the person can view, monitor, and/or control the robots together, separately, in groups, and/or in any division desired. In some cases, remote network 302 can present to the user each robot separately for viewing, monitoring, and/or operating. In some implementations, remote network 302 can present a plurality of the robots as a single unit and coordinate the activities of the robots so that they behave in concert.

Figure 4:
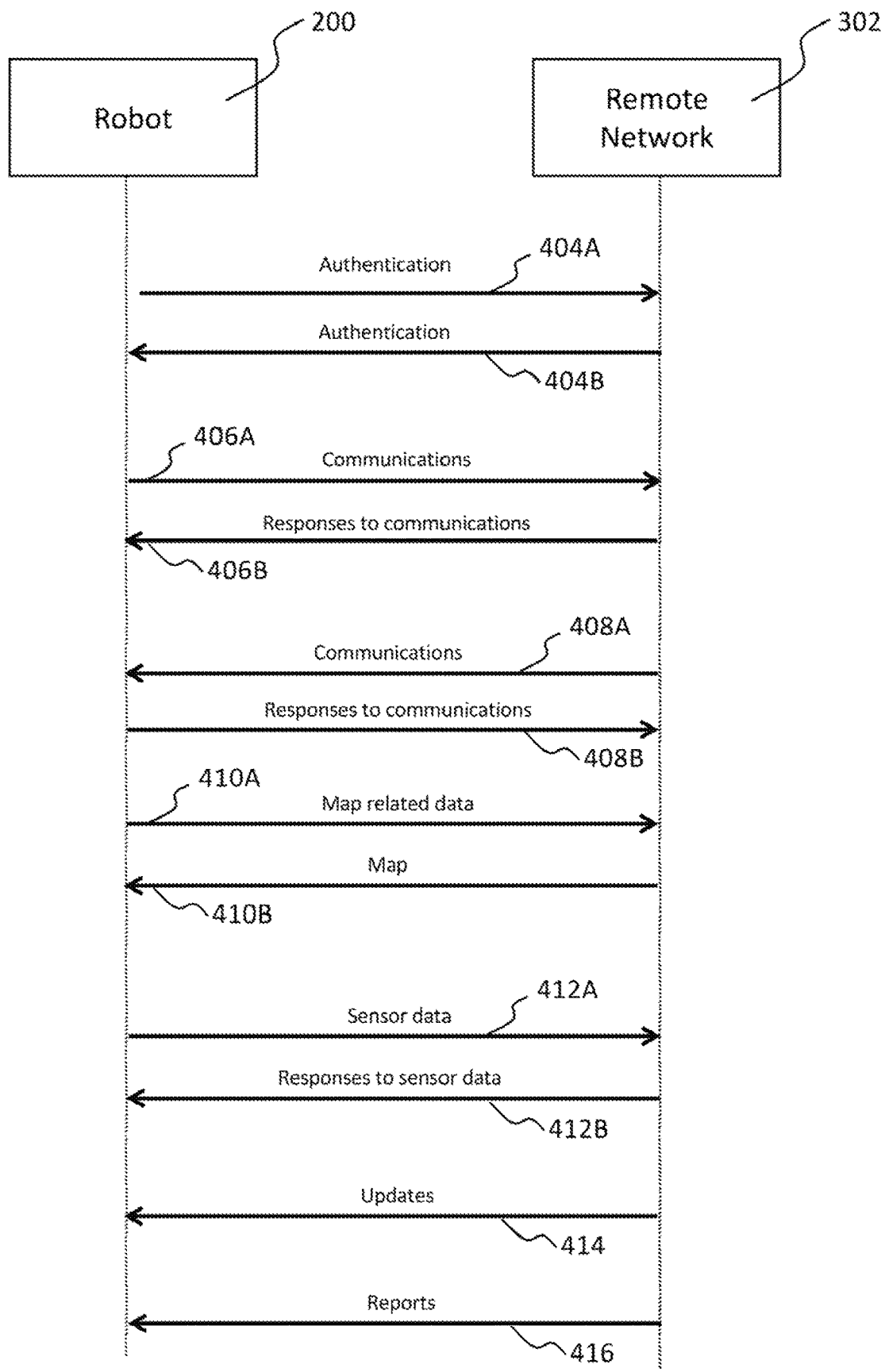
FIG. 4 is a signal table illustrating the signals that can go between a robot and a remote network in accordance with some implementations of this disclosure.

FIG. 4 is a signal table illustrating the signals that can go between robot 200 and remote network 302 in accordance with some implementations of this disclosure. For example, signal 404A can be an authentication signal, which can be used verify that robot 200 is permitted to communicate with remote network 302. Signal 404A can initialize an authentication procedure, such as a handshaking procedure between robot 200 and remote network 302, where remote network 302 sends signal 404B, which can also be an authentication signal. In some implementations, signals 404A and 404B can include identifying information, such as software version, unique ID, hardware version, and/or other information about robot 200. Signal 404A and 404B can also contain pairing information, such as timing information, encryption keys, public/private keys, authentication information, advertising parameters, address, make/model, name, access profiles, and/or any other relevant information for pairing.

Signal 406A can include communication signals sent from robot 200 to remote network 302. Signal 406A can include commands, interrogatories, requests, control signals, statuses, alerts, data/information, maps, etc. By way of illustration, commands can include commands to remote network 302 that direct remote network 302 to perform an action, such as connect, wake up, push/pull information, issue a command, authenticate, etc. As another illustration, interrogatories and requests can include requests for information from remote network 302, such as information about remote network 302 (e.g., status information), information about other robots, updates, time estimates (e.g., of delivery of information, assistance, idle time, etc.), and other information desired by robot 200. As another illustration, robot 200 can send control signals, including remote access and/or administration of remote network 302.

As another illustration, robot 200 can send status information as it travels in an environment. Such status information can include statuses stating robot 200 is powered on/off, driving, stopped, desires assistance, has errors, and/or any other condition robot 200 can be in. As another illustration, alerts can include information regarding robot 200 that is more critical than a standard communication. For example, alerts can include messages saying, at least in part, robot 200 desires assistance, maintenance, checks, updates, repairs, etc. Remote network 302 can respond to signal 406A with signal 406B, which can include requested information and other commands, interrogatories, requests, control signals, statuses, alerts, data/information, maps, etc.

Similarly, signal 408A can include communication signals sent from remote network 302 to robot 200. Signal 408A can include commands, interrogatories, requests, control signals, statuses, alerts, data/information, maps, etc. By way of illustration, commands can include directions to robot 200 to perform a task such as to move (e.g., forward, left, right, back, up, down, and/or any combination of the aforementioned), to request to push/pull statuses, to request to push/ pull data, and/or to send information to/from remote network 302, to stop, etc. Robot 200 can respond to signal 408A with signal 408B, which can include requested information and/or other commands, interrogatories, requests, control signals, statuses, alerts, data/information, maps, etc.

Signal 410A can include map related data generated by robot 200 and/or stored on robot 200. Signal 410A can be sent from robot 200 to remote network 302. In some implementations, the map related data can include an actual map created by robot 200 as it traveled in an environment. In some implementations, the map can include a route. The route can be created simultaneously with the map or at a separate time. In some implementations, map related data may not include an actual map, but rather sensor data, graphs, bubbles, poses, probabilities, and/or other data that can be used to construct a map and/or is related to map.

Figure 5A:
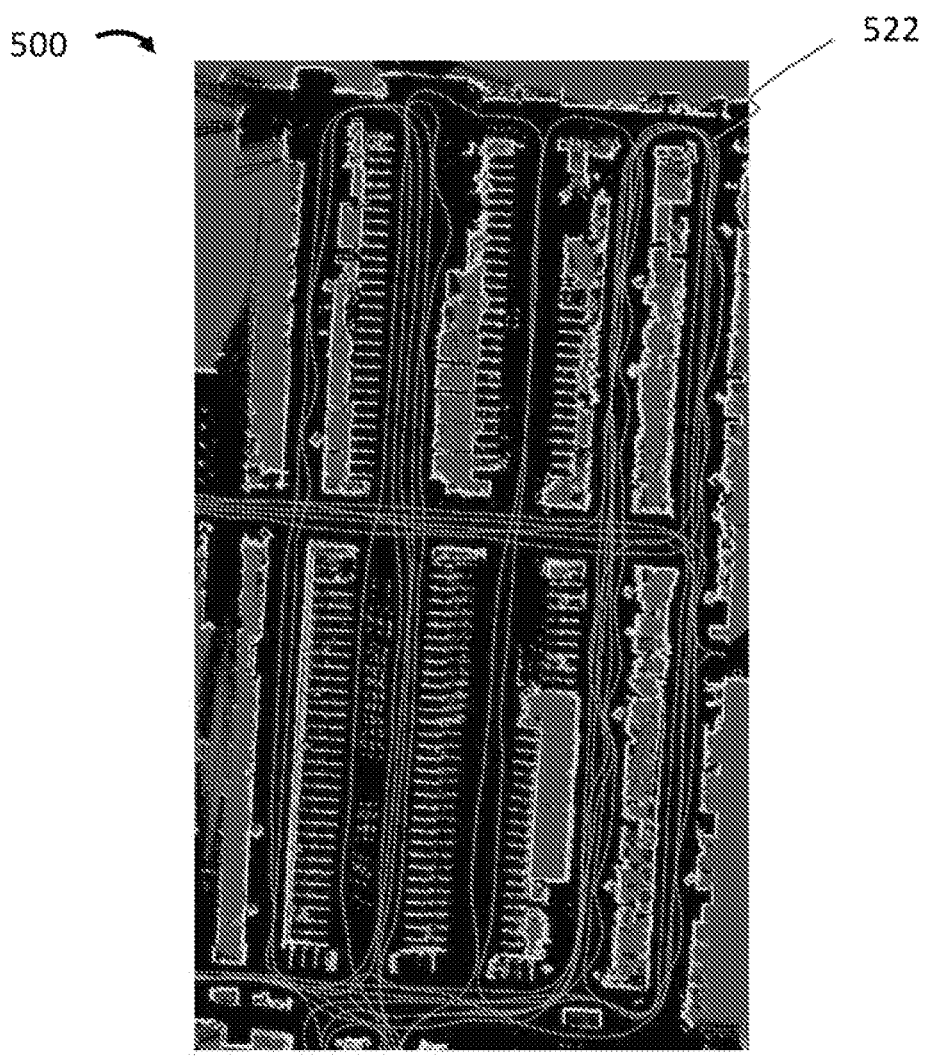
FIG. 5A is a top view map and route generated by a robot as it travels in an environment in accordance with some implementations of this disclosure.

By way of illustration, FIG. 5A is a top view map 500 and route 522 generated by robot 200 as it travels in an environment in accordance with some implementations of this disclosure. In some implementations, the generation of map 500 can be performed by mapping and localization unit 224. Map 500 can comprise pixels, wherein each pixel corresponds to a mapped area of an environment. The number of pixels in map 500 can be determined based on the resolution of map 500. Map 500 can be substantially similar in layout as the environment, where each pixel in map 500 can approximate a location in the environment. Each pixel can represent an area, which can be uniform or non-uniform. For example, a pixel could represent one area unit, a n×m or n×n area unit (where n and m represent numbers), or a non-uniform unit of area.

The mapping can be performed by imposing data obtained at least in part by sensors of sensors unit 212 into a two-dimensional ("2D"), three-dimensional ("3D"), and/or four-dimensional ("4D") map representative at least in part of the environment. For example, map 500 can include depictions representative at least in part of obstacles and/or objects detected by robot 200. Map 500 can also record demonstrated routes, such as routes robot 200 learned while under user control. For example, mapped route 522 can include coordinates (e.g., x and y in a 2D map or x, y, and z in a 3D map) based at least in part on the relative position, orientation, and/or pose of robot 200 (e.g., including one or more of location, displacement, and orientation) to a reference, such as an initialization location, end location, and/or any other location. For example, pose can have (x, y, theta) coordinates. As used herein, the term position has its ordinary and customary meaning. For example, in some cases, position can include a location in terms of displacement, coordinates, etc. of an object, robot 200, etc. In some cases, position can also include an orientation of an object, robot 200, etc. Accordingly, in some cases, the terms position and pose can be used interchangeably to include one or more of location, displacement, and orientation. Map 500, created through the demonstration process, can record part of and/or substantially the whole of the environment that robot 200 sensed in one or more demonstrations/trainings. For this reason, some may call map 500 a global map. In some cases, map 500 can be static in that after a demonstration/training, map 500 may not be substantially updated. In some implementations, map 500 and mapped route 522 can also be generated separately (e.g., by a user using a computer and/or remote network 302) and uploaded onto robot 200.

In some implementations, units (e.g., pixels, voxels, and/or any other unit) of map 500 can have one or more states, where the state can be indicative at least in part of a characteristic of the position/location in environment represented by that unit. For example, units of map 500 can be binary, where a first unit state (e.g., pixel value) can be indicative at least in part of a clear (e.g., navigable) location, and a second unit state can be indicative at least in part of a blocked (e.g., not navigable) location. By way of illustration, a unit value of zero (0) can be indicative at least in part of a clear location and a unit value of one (1) can be indicative at least in part of a blocked location.

In some implementations, instead of or in addition to the aforementioned binary states, units of map 500 can have other unit states such as one or more of: a unit state indicative at least in part of an unknown location (e.g., a position/location with no information); a unit state indicative at least in part of a position/location that should not be traveled to; a unit state indicative at least in part of being part of a navigable route; a unit state indicative at least in part of an area in which robot 200 has traveled; a unit state indicative at least in part of an area to which robot 200 has not traveled; a unit state indicative at least in part of an object; a unit state indicative at least in part of standing water; and/or any other categorization of a position/location on map 500. In some implementations, a unit state, and/or data associated with a unit, can be indicative at least in part of actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensors unit 212, and/or any other action by robot 200.

Units of map 500 can also store more than a single value or unit state. For example, each unit of map 500 can store a plurality of values such as values stored in a vector and/or matrix. These values can include values indicative at least in part of the position/pose (e.g., including location and/or orientation) of robot 200 when the position is measured at a point (e.g., unit such as a pixel, voxel, etc.) along route 522. These values can also include whether robot 200 can clean or not clean a position/location, and/or other actions/action-specific tasks that can be taken by robot 200.

Robot 200 can travel along a route, which can be reflected in map 500 as route 522. At each location robot 200 travels along the route, robot 200 can determine its position and/or orientation, in some cases relative to an initialization location (e.g., initialization location 222), object (e.g., home locator and/or initialization object), and/or another reference point. These mapping and localization functions can be performed by mapping and localization unit 224.

For example, robot 200 can measure or approximate its distance from the initialization location (or another reference point) using odometry, where robot 200 can use proprioceptive sensors of sensors unit 212 (e.g., wheel encoders (e.g., rotary encoders), visual odometry, Inertial Measurement Units ("IMUs") (including accelerometers, magnetometers, angular rate sensors), and the like), to track the movements of robot 200 since starting at an initialization location. By way of illustrative example, one or more of the proprioceptive sensors can be wheel encoders that measure and/or estimate distance based at least in part on the revolution of the wheels of robot 200. As another illustrative example, visual odometers can be used to measure or estimate the distance travelled and/or orientation of robot 200 through sequential images taken by a camera. The visual odometers can construct an optical flow field (e.g., using Lucas-Kanade methods or other methods) and/or estimate camera motion, such as by using Kalman filters or projection. As another non-limiting example, IMUs can be used to measure and/or estimate the position and/or orientation of robot 200.

Each location that is part of a route can correspond to a unit (e.g., pixel, voxel, etc.) on route 522 in map 500, where the unit state of route 522 indicates the unit is part of a navigable route. As robot 200 travels, robot 200 can also measure the position and/or orientation of robot 200 relative to objects using one or more sensors unit 212. These measures can be taken at discrete times and/or locations, represented as nodes. Robot 200 can also take scans using one or more sensors of sensors unit 212 to detect its environment. In this way, robot 200 can detect and/or measure the position and/or orientation of robot 200 relative to objects, such as shelves or walls.

In the case where robot 200 detects objects, robot 200 can use sensors of sensors unit 212 to detect and/or measure the position and/or orientation of those objects in a plurality of directions relative to robot 200. At the same time, robot 200 can use sensors unit 212 to estimate the position and/or orientation of robot 200. As robot 200 moves in the environment, different objects can come within the range of sensors of sensors unit 212. For example, sensors can be positioned on front side of robot 200 and can have a predetermined range. For example, robot 200 can detect objects at a front side up to the predetermined range. Similarly, other sensors can each have ranges and detect objects within those ranges. These sensors can be positioned on the front, back, left side, right, side, bottom, top, and/or any combination of the foregoing.

In some cases, sensors unit 212 may not sense certain areas. For example, an object can impede the availability of robot 200 to sense an area, or the area can appear in a blind spot (e.g., place not covered by the measuring range of the sensors).

As illustrated, route 522 includes traversals of the aisles and other movements, including horizontally illustrated traversals through paths between aisles. As illustrated in map 500, robot 200 can clean a floor while traversing the aisles, driving over the floor of aisles a plurality of times.

In some cases, map 500 can be a completed, accurate map that is representative of a ground truth reality. However, it is not straight-forward to create a map substantially similar to the ground truth simply by plotting data collected by sensors unit 212 on a map. Sensors of sensors unit 212 can have noise, measurement drift, etc. As a result, sensors of sensors unit 212 may not always unambiguously identify features in the environment. Sensors of sensors unit 212 may also not always unambiguously identify the position and/or pose of robot 200.

Because identification by sensors unit 212 may not be unambiguous, robot 200 can probabilistically determine its position and/or the position of features of an environment. As robot 200 moves through an environment while mapping, robot 200 can record sensor data from sensors unit 212. In some implementations, while robot 200 moves through the environment, it can also record internal robot commands (e.g., move forward, left, right, back, rotate, etc.). The sensor data from sensors unit 212 can also be compared to itself or other data, such as through scan matching, to determine the relative positions. As a result, in some implementations, robot 200 (e.g., using mapping and localization unit 224) can build a posterior probability distribution function of a map given at least sensor data, scan matching, and the internal robot commands. Other factors can also be considered.

Figure 5B:
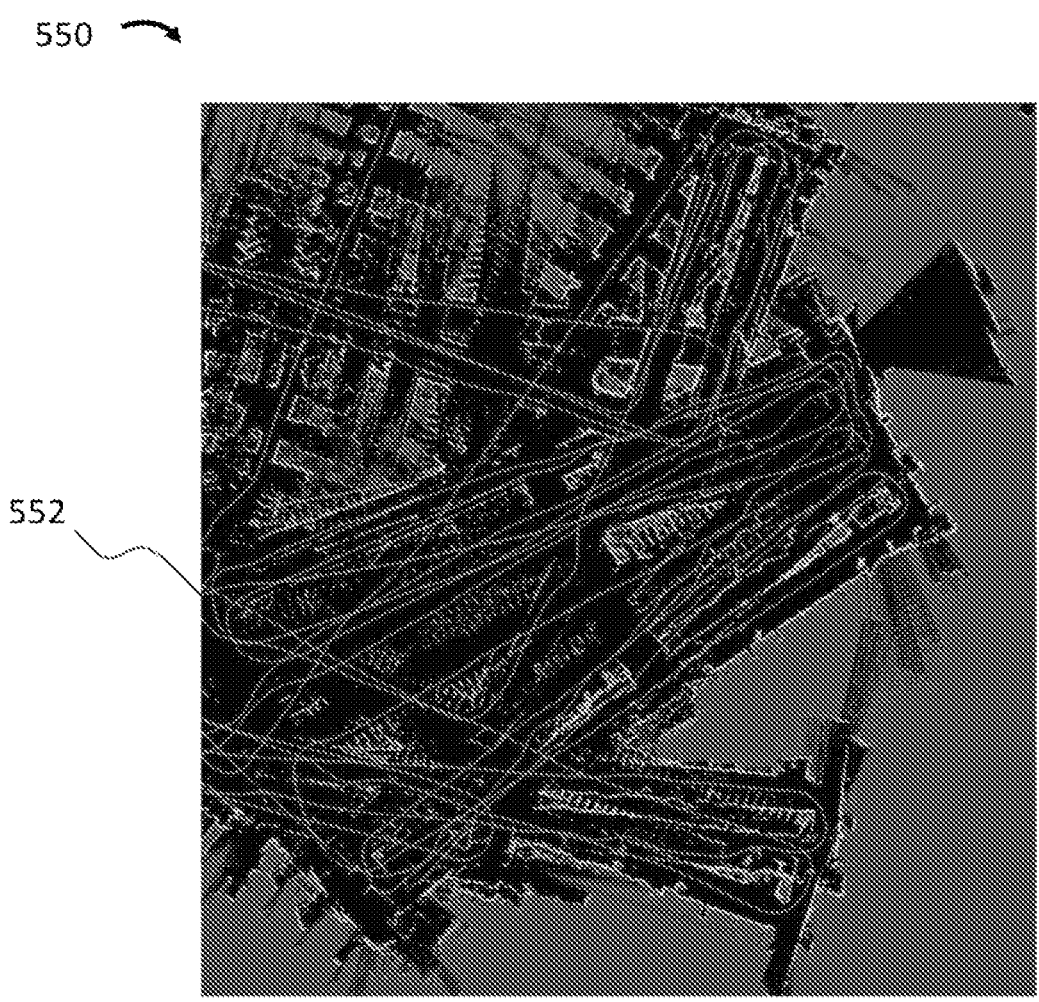
FIG. 5B is a map that does not accurately reflect the surrounding and traveled route of a robot in accordance with some principles of this disclosure.

Because of the ambiguity in measurements, robot 200 can generate maps that do not reflect the surroundings and/or traveled routes of robot 200 if not corrected. For example, FIG. 5B is a map 550 that does not accurately reflect the surrounding and traveled route of robot 200 in accordance with some principles of this disclosure. Because of noise, sensor drift, and/or other factors, map 550 appears distorted. As a result, route 552 appears to go all over the place. The mapped environment around route 552 appears to spread out and/or overlap upon itself, with features that do not reflect the ground truth. By comparison, map 550 can be corrected into map 500, where map 550 is actually a map of the same environment and route as map 500; however, map 550 is distorted and map 500 more accurately reflects reality. As can be observed (and as illustrated in map 500), the environment actually comprises a series of aisles and not the features shown in map 550.

Returning to FIG. 4, remote network 302 can also perform error correction on the map related data. In some implementations, map related data can be sent to remote network 302 for storage and analysis. For example, remote network 302 can optimize a graph and construct a map that better reflects the environment in which robot 200 travelled. Such error correction can be performed by a computer of remote network 302. In some cases, where a computer cannot correct the errors, a person can view the map related data and manually make corrections. By way of illustration, robot 200 can send to remote network 302 map related data that would generate map 550 and/or is map 550. Remote network 302 could then run systems and methods for map correction and generate and/or return map 500.

By way of illustration of the systems and methods for map correction implemented by remote network 302 (e.g., by a map processing unit of remote network 302), in some cases, map related data may not include a completed map, but rather data and/or information to make a map. For example, scans of an environment can be taken as robot 200 travels. These scans can be taken, for example, by a LIDAR and/or any sensor(s) of sensors unit 212. As another example, map related data can include a graph, such as a graph comprising nodes indicative at least in part of measurements taken by robot 200. The graph can be optimized (e.g., configured such that the nodes are positioned such that the potential error in their positioning is substantially minimized) or not optimized (e.g., without performing actions to position the nodes such that the potential error in their positioning is substantially minimized). As previously described, map related data can include errors. For example, map related data can include a map that is misaligned due to measurement error and/or other inaccuracies in its constructions. Similarly, other map related data can be erroneous. Remote network 302 can receive signal 410A and store the map related data. Remote network 302 can also process the map related data received in signal 410A. For example, remote network 302 can generate a map from the data, such as by using simultaneous localization and mapping ("SLAM"), augmented reality, scale-invariant feature transform ("SIFT"), and/or any other mapping systems and methods known in the art.

In some implementations, remote network 302 can perform corrections of data based at least in part on comparing data from a plurality of sensors of sensors unit 212. For example, robot 200 can have a plurality of sensors detecting features of an environment and/or the odometry of robot 200. In some cases, discrepancies between sensors of sensors unit 212 can be indicative at least in part of error. In some cases, where a particular sensor is determined to be more reliable than others, that sensor can be used at least in part to correct the data of the other sensors. In some cases, a plurality of sensors can be used in a sparse error correction with multiple measurements, recursive error correction, and/or other known algorithms for correcting sensor data using a plurality of sensors.

In some implementations, remote network 302 can receive a map of an environment (e.g., a map sent by robot 200 and/or uploaded by a user). Remote network 302 can then determine a route on the environment. For example, a computer and/or user can draw a route onto the map of the environment received by remote network 302. The computer can draw the route using a variety of techniques. For example, the computer can use a fill, wherein the computer assumes open areas (e.g., non-obstructed areas) in which a robot can travel should be travelled. For example, if robot 200 is a floor cleaner, it can be assumed that it is desirable for robot 200 to clean as much floor as possible. In some cases, fill can be directed to a particular space and/or portion of a map. As another example, the computer can compute an optimal route in which robot 200 substantially minimizes and/or reduces travel to complete a task. For example, if it is desired for robot 200 to travel from a first point to a second point, a computer can determine the path based on one or more of: substantially minimizing the distance to travel; substantially minimizing the battery energy used and/or other consumables; substantially minimizing the number of obstructions and potential assists that may be desired (e.g., avoiding obstacles); and/or other consideration that can impact the time and/or resources of traveling from the first point to the second point.

Remote network 302 can also add, change, and/or otherwise modify unit states (e.g., pixel states, voxel states, etc.) of a map using a computer and/or user. For example, remote network 302 (e.g., a human and/or computer operating remote network 302) can assign unit states to one or more of the units in a map, thereby altering (and/or defining) the behavior of robot 200 when robot 200 navigates in accordance to the map. Advantageously, this can allow the behavior of robot 200 to change as desired. For example, a computer of remote network 302 can determine that robot 200 gets stuck when it goes into a particular area of a map. Remote network 302 can make this determination based at least in part on historical occurrences of the navigation of robot 200 (e.g., historical occurrences where robot 200 got stuck) and/or a determination based at least in part on measurements of an area. Accordingly, a computer and/or human operator of remote network 302 can change the unit states of a map so that robot 200 does not go into an area. As another example, a computer and/or human operator of remote network 302 can determine to change and/or modify the behavior of robot 200. By way of illustration, where robot 200 is a floor cleaner, the desired cleaning areas of robot 200 can change. For example, some days, robot 200 can clean one area, and some days, robot 200 can clean another area, even along the same route. Cleaning all areas can take too much time and/or use too many resources. Accordingly, a computer and/or human operator of remote network 302 can change the unit states of the map to correlate with the desired areas desired to be clean, such that the areas that are desired to be cleaned are cleaned and other areas are not.

In some implementations, remote network 302 can store a library of map related data. In some implementations, this library can include various map related data collected by robot 200, other robots, and/or uploaded by any device to remote network 302 (e.g., an access point and/or other device). In some cases, the map related data in the library can be from a variety of environments. In some cases, the map related data in the library can be taken under different conditions. For example, the map related data can be taken in different lighting conditions, angles, sizes, distances, clarity (e.g., blurred, obstructed/occluded, partially off frame, etc.), colors, surroundings, etc. The map related data in the library can be taken by a sensor (e.g., sensors of sensors unit 212) and/or generated automatically, such as with a computer program that is configured to generate/simulate (e.g., in a virtual world) library map related data from different lighting conditions, angles, sizes, distances, clarity (e.g., blurred, obstructed/occluded, partially off frame, etc.), colors, surroundings, etc. The library can also store changes and/or corrections performed by a user and/or computer on map related data, such as changes and/or corrections to account for errors. Moreover, the library can record the situations where changes were made and the situations that were considered erroneous. In this way, the library can then be used with machine learning in order for remote network 302 and/or robot 200 to improve mapping.

For example, the known machine learning methods can run on remote network 302 (e.g., on a controller and/or computer of remote network 302). The machine learning methods can correlate situations where a human operator and/or computer made changes to data. In some cases, the machine learning methods can consider those changes as corrections of errors and make similar corrections when substantially similar errors (and/or circumstances) occur.

As a result, remote network 302 can send signal 410B to robot 200. Signal 410B can include one or more maps. The maps can include a map of an environment and/or routes in which robot 200 can travel. In some cases, the map can include additions (e.g., unit changes (e.g., changes to states of pixels, voxels, etc.), routes, corrections, etc.) by a user and/or computer. Robot 200 can then use these maps to navigate.

Robot 200 can send signal 412A, which can include sensor data. Sensor data can include any data taken by one or more sensors of sensors unit 212. Such sensor data can include data collected by robot 200 and/or stored by robot 200 as it navigated an environment. Such sensor data can include map related data that can be used, at least in part, in generating a map and/or route of an environment.

In some implementations, signal 412A and/or signal 412B can be used for calibration, such as the systems and methods for calibration described with reference to FIG. 3B. For example, signal 412A can include measurements, configurations, and/or any data from one or more sensors of sensors unit 212. Remote network 302 can receive signal 412A and determine any adjustments of calibration. Signal 412B can include instructions for recalibrating the sensor. In some cases, signal 412B can be a reset and/or recalibration signal that tells robot 200 to recalibrate one or more sensors of sensors unit 212.

In some cases, sensor data can be location-specific, wherein the sensor data is associated with a particular location on a map. In some implementations, the sensor data can be sent by robot 200 with coordinates and/or relative positions (e.g., poses) of robot 200 as it navigates an environment. Advantageously, remote network 302 can then know the location of robot 200 as sensor data is being sent.

As another example, sensor data can be time-specific. By way of illustration, robot 200 can have an event of interest. Such an event of interest can include, by way of example, a stopping, a collision, near collision, anomaly, failure, error, and/or any event desired to be explored by operators of robot 200. For example, an operator can be interested in collisions by robot 200 and what caused them. An operator an be interested in a system failure and/or error by any portion of robot 200, and why it happened. An operator can be interested in how robot 200 behaves in certain scenarios.

The sensor data can be time stamped and/or indexed based on occurrences of predetermined events of interest. Advantageously, robot 200 can send to remote network 302 sensor data related to a particular time and/or index. Such particular time and/or index can be selected by robot 200 (e.g., by robot 200 and/or an operator of robot 200) and/or remote network 302 (e.g., a computer and/or operator). For example, remote network 302 can send a request in signal 408A to send sensor data as sensor data 412A.

In some cases, the particular time and/or index can include sensor data in a window around an event of interest. Such size (e.g., time) of the window can be preset (e.g., as a parameter) and/or determined based on a request (e.g., by an operator and/or remote network 302). This sensor data can allow diagnostics and analysis on the state of robot 200 and/or the environment at an event of interest. For example, a camera of sensors unit 212 can take images in a window around an event. The images can then be reviewed in order to determine characteristics of the surroundings of robot 200 prior to an event of interest. Similarly, other sensors of sensor unit 212, including proprioceptive sensors and/or exteroceptive sensors, can provide additional context surrounding an event of interest.

Figure 6:
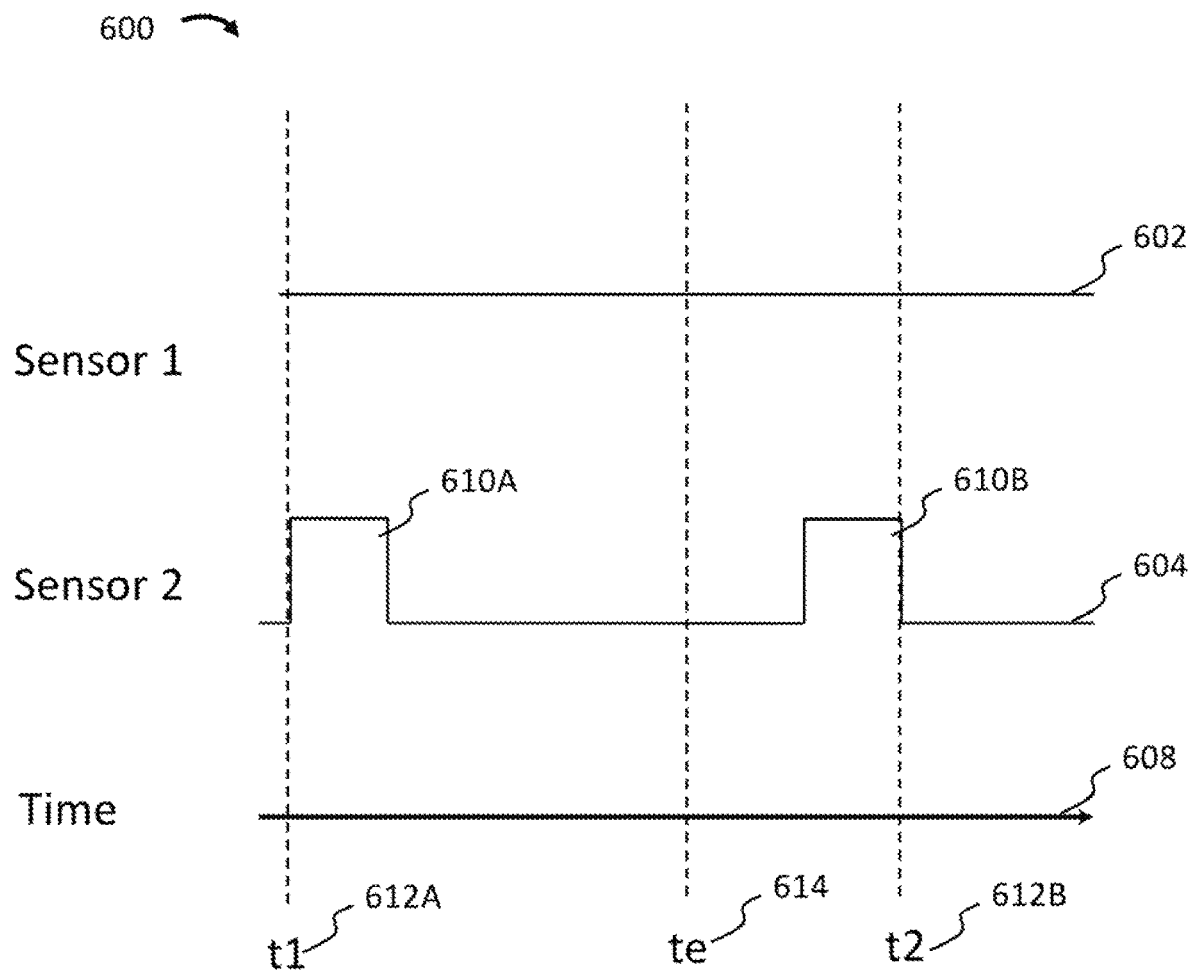
FIG. 6 is timing diagram of sensor data taken in a window in accordance with some implementations of this disclosure.

By way of illustration, FIG. 6 is timing diagram 600 of sensor data taken in a window in accordance with some implementations of this disclosure. Time line 608 can be indicative at least in part of the time. In some cases, time line 608 can represent at least in part the time, such as based on the local and/or world times. In some cases, time line 608 can represent at least in part a relative time. In some cases, time line 608 can have units in milliseconds, seconds, minutes, hours, and/or any standard unit. In some cases, time line 608 can have units in predetermined time intervals that do not have standard units. In some cases, the time intervals can be uniform (e.g., substantially the same), but in some cases, the time intervals may be not uniform (e.g., not substantially the same). In some cases, the system may operate based at least in part on time line 608, such as in a synchronous system. However, in some cases, the system may not operate based at least in part on time line 608, such as in an asynchronous system.

Time 614 can be representative of te, the time of an event of interest. Line 602 can be indicative of the data collected by a first sensor of robot 200 (e.g., a sensor of sensors unit 212). As illustrated, line 602 is representative at least in part of a continuous and/or analog signal.

Line 604 can be indicative of the data collected by a second sensor of robot 200 (e.g., a sensor of sensors unit 212). As illustrated, line 604 is representative at least in part of a discretized and/or digital signal. In some cases, line 604 can be indicative of a sensor that takes measurements periodically and/or as desired (e.g., a sensor of sensors unit 212 that is configured to take data in the case of an event of interest). By way of illustration, a sensor of sensors unit 212 can be communicatively and/or operatively coupled to an accelerometer, which causes that sensor to collect data if there is a change in acceleration over a threshold. Line 604 illustrates waveforms 610A and 610B. Each of waveforms 610A and 610B can be indicative at least in part of the collection of data by the second sensor.

The first sensor and second sensor, and corresponding lines 602 and 604, are illustrative of example sensors. As described with reference to sensors unit 212, there can be a plurality of sensors of robot 200, each of which can collect data that is relevant and/or desired in determining context. Accordingly, there can be any number of sensors collecting data, at least some of which having its own data line.

A window around an event of interest can provide sensor data around the time of the event of interest (e.g., time 614). For example, time 612A can be a first time. Time 612A can open the window. Time 612B can be the end of the window. The data collected by one or more sensors of sensors unit 212 taken in the window of time between time 612A and time 612B can then be transmitted as signal 412A, potentially providing context to the event of interest.

As illustrated, time 612A appears before waveform 610A and time 612B appears after 610B. However, this may not always be the case. For example, in some implementations, the window can be predefined. For example, the time between time 612B and time 614 (and/or time 612B and time 612A) can be a predetermined amount of time. Similarly, the time between time 612A and time 614 (and/or time 612A and time 612B) can be predetermined. In some implementations, these predetermined amounts of time can be agnostic of the data collection, determining the window based at least in part on timing rather than being driven by events (e.g., taking of sensor data). The predetermined times can be based at least in part on one or more of: the expected time for an event of interest to occur; the expected time that would be expected to give context; empirically measured times that are effective in giving context; and/or any other helpful amount of time that would enable context to be given to an event of interest. Advantageously, having predetermined times can simplify computations and increase speed of data transfer. In many cases, it can be difficult to proceed with analyzing a situation with little to no information, so a window of even predefined duration that may or may not collect all context would provide at least some context. Additional data can then be gathered if desired.

However, in some implementations, the time between (a) time 612B and time 614, and (b) time 612A and time 614 can be dynamic. For example, time 612A and/or 612B can be cued to an occurrence (e.g., event), such as the taking of sensor data. For example, time 612A can be cued to a measurement, such as the rising edge of waveform 612A. Similarly, time 612B can be cued to an occurrence (e.g., event), such as the taking of sensor data. For example, time 612B can be cued to a measurement, such as the falling edge of waveform 610B.

In some cases, sensors of sensors unit 212 can also be used to cue time 612A and/or time 612B (which can also be indicative at least in part of the occurrence of an event of interest at time 614). For example, time 612A and/or 612B can be cued by an accelerometer, which can indicate at least in part a change in direction and/or speed. Advantageously, such a change can be indicative at least in part of a change in circumstances in which an operator is interested. As another example, time 612A and/or 612B can be cued by visual indicia taken by a camera. For example, time 612A and/or 612B can be cued to visual cues as predefined and/or as learned through machine learning to be associated with an event of interest. By way of illustration, time 612A and/or 612B can be cued to: a sudden movement, the end of a movement, predetermined colors (e.g., seeing a red stop sign and/or any other prompts within the field of view of the camera), people (e.g., adults and/or children), obstructions, movements toward robot 200, movements away from robot 200, predefined gestures (e.g., hand signs/movements), a detected spill and/or leakage, and/or any visual occurrence that can be associated with an event of interest. As another example, time 612A and/or 612B can be cued by sounds picked up by a microphone of sensors unit 212, such as a crash, words/sounds by a human/robot, malfunction (sputtering, clanging, dragging, etc.), and/or any audio clues. In some cases, a plurality of sensors of sensors unit 212 can cue time 612A and/or 612B, such as any combination of the above and/or any combination that is predetermined and/or associated with an event of interest by machine learning.

Where signal 412A is sent by robot 200 to remote network 302, a computer and/or user of remote network 302 can then analyze the sensor data. Sensor data can be received in a single signal 412A or a plurality of signals substantially similar to signal 412A and/or included in signal 412A. Remote network 302 can then send signal 412B, which can include responses to the sensor data.

The analysis of the data can include determining adjustments to the configuration of robot 200. For example, remote network 302 can determine that robot 200 could behave differently in the scenario presented by the sensor data, and reprogram robot 200 to behave in the desired way in the circumstances. In some cases, remote network 302 can use the sensor data in a library, such as the library containing map related data described above, for machine learning. In this way, remote network 302 can aggregate experiences by robot 200 and/or other robots to determine desirable behaviors. In some cases, signal 412B can include instructions and/or updates to modify the behavior of robot 200. The sensor data can also aid in correcting a map, such as described with reference to FIGS. 5A and 5B.

In some cases, robot 200 can stop and request assistance, as described with reference to method 150. In such cases, remote network 302 can then receive contextual information through the sensor data from robot 200 in order to provide instructions. In such a case, the event of interest can be the stoppage of robot 200 and the desire for assistance. In some cases, robot 200 can continue to send sensor data to provide current context to remote network 302 to allow it to better instruct robot 200. Advantageously, the sensor data can allow remote network 302 to determine what happened and/or is happening to robot 200 while being remote.

For example, the assist call can be the event of interest and data in a window around the assist call (e.g., time between time 612A and 612B in FIG. 6) can be transmitted. This data can provide context and allow a computer and/or user of remote network 302 to determine actions for robot 200, and instruct robot 200 accordingly. For example, visual image from a camera of robot 200 can be transmitted, allowing a computer and/or user of remote network 302 to see the field of view of the camera and determine why robot 200 is calling for an assist. In this way, the computer and/or user of remote network 302 can determine what robot 200 can do to address the situation. Analogously, any other sensor of sensors unit 212 can be similarly used for assistance.

In some cases, signal 414 can include updates, such as software updates. In some cases, such updates can include mapping and localization software, firmware, maps, sensor firmware, added features, patches, security updates, etc. Advantageously, this can allow robot 200 to improve its functionality as improvements and/or changes are made. A person would not have to be onsite to update robot 200. Instead, the updates can be pushed remotely by remote network 302 and/or pulled by robot 200.

In some implementations, robot 200 is configured to only pull signals from remote network 302. For example, where robot 200 is configured only for pulling, signals from remote network 302 to robot 200 can only transfer data onto robot 200 if robot 200 pulls such data. Advantageously, having a pull only configuration can allow for added security wherein remote access to robot 200 is limited. This can prevent hacking and/or other sabotage of robot 200.

Through the signals received by remote network 302 from robot 200 (e.g., signals 406A, 408B, 410A, 412A, etc.), remote network 302 can monitor robot 200. For example, a computer and/or user of remote network 302 can view robot 200 in substantially real-time and/or at a later time. This viewing can include monitoring: the progress of robot 200 (e.g., effectiveness at its task), any assistance desired, the route robot 200 is travelling and/or has travelled, statuses, and/or any other aspect of robot 200.

In some implementations, remote network 302 can provide commands to robot 200. Because these commands can include instructions (e.g., actuate, move, etc.), remote network 302 can remote control and/or operate robot 200. Depending on the speed in which data transfers, remote control can be substantially real-time or delayed (e.g., based on latency and/or data transfer time).

Remote network 302 can provide summary information in the form of reports. Signal 416 can include a report sent to robot 200. In some cases, reports can also be sent, in addition or in the alternative, to an operator (e.g., using email, mail, hand delivery, file transfer, messaging, etc.). In some implementations, such reports can also be generated by robot 200 (e.g., the foregoing generation of the reports can be performed by robot 200 in addition to and/or the alternative of remote network 302), however, advantages of using remote network 302 for report generation are that it can: accumulate data from multiple robots, utilize human operation without a person having to go to the site of robot 200, implement more advanced hardware, and/or other advantages.

Figure 7A:
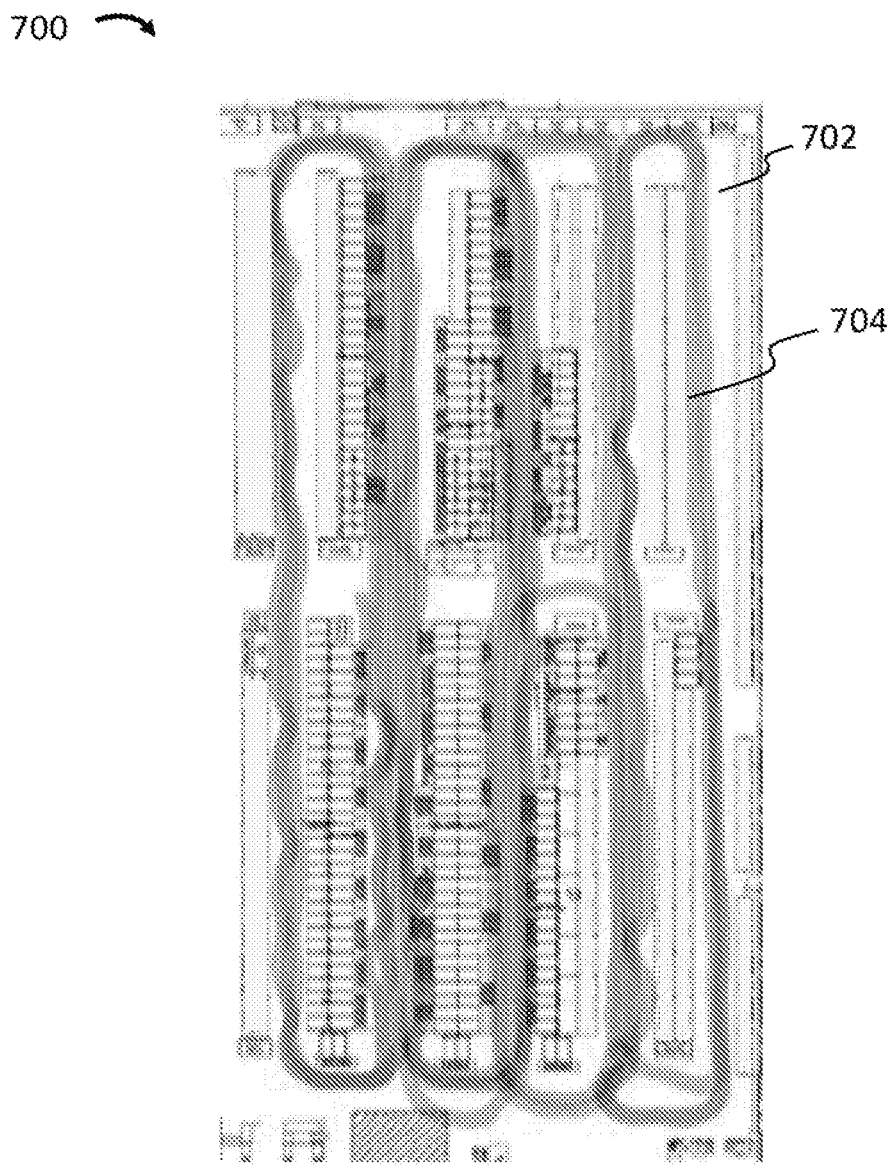
FIG. 7A includes a map comprising route overlaid on an environment map in accordance with some implementations of this disclosure.

Reports can include summary information about routes. By way of illustration, FIG. 7A includes map 700 comprising route 704 overlaid on an environment map 702 in accordance with some implementations of this disclosure. Maps generated by robot 200 can be instrumental in allowing robot 200 to navigate a space; however, in some cases, these maps can be more difficult to read for people and/or less visually appealing. For example, robot 200 can generate a map as described in this disclosure based at least in part on data from one or more sensors of sensors unit 212. This map can be generated each time robot 200 travels an environment, allowing robot 200 to determine where it has travelled. The sensor data may not accurately measure elements of the environment (e.g., elements can be obstructed from the field of view of a sensor) and/or the information from a sensor can distort elements of an environment from the way a human may typically view them. Accordingly, remote network 302 can utilize uploaded maps that are more accessible for viewing as environment map 702. For example, environment map 702 can be uploaded by a user, such as a map manually created, computer generated, and/or created from visual images of the environment. Route 704 can then be overlaid on environment map 702, such as by a user (e.g., manually) and/or by a computer (e.g., of remote network 302 and/or robot 200). For example, a computer can be configured to compare a map generated by robot 200 based at least in part on sensor data and/or an uploaded map. Remote network 302 can correlate the maps by using various techniques. For example, remote network 302 can do a comparison on a pixel-by-pixel and/or region-by-region basis. In some cases, the maps can be preprocessed, such as resizing and/or performing various image processing techniques (e.g., error correction, filtering, adjusting contrast and/or saturation, changing colors, noise reduction, resizing, upscaling, downscaling, and/or any image processing algorithms and/or methods), prior to comparison in order to facilitate the comparison.

Other techniques can be utilized to correlate the map generated by robot 200 with an uploaded map based on at least in part on sensor data and/or other uploaded maps. For example, comparators and/or known comparison methods and/or algorithms in the art can be utilized. In some cases, visual systems and machine learning can be utilized by a machine to compare maps and then correlate them. In this way, remote network 302 can learn to associate maps with one another based on indicia that remote network 302 (and/or a user) determines across a plurality of maps.

Advantageously, maps substantially similar to map 700 can allow a user and/or operator of robot 200 to audit the performance of robot 200. The user and/or operator can see where robot 200 has travelled and assess the effectiveness of robot 200. For example, in the case of a floor cleaner, where the locations in which robot 200 travelled can be indicative at least in part of the areas in which robot 200 has cleaned, map 700 can provide a record of where robot 200 has cleaned. This can allow further planning (e.g., on a day-to-day, week-to-week, month-to-month, and/or any other time period basis) and/or evaluation, optimization, and/or adjustments to work flow.

Advantageously, overlaying maps on uploaded maps as described in this disclosure can allow accurate data to be mapped based at least in part on the mapping and/or localization of robot 200. This can allow for more accuracy and further documentation of what robot 200 experienced.

Reports can also include other data. Such other data can be summary data based at least in part of sensor data and other communications sent between robot 200 and remote network 302. For example, reports can include power on/off times, operation in different modes (e.g., manual mode or autonomous mode where robot 200 has dual operative modes), maintenance, lower power mode, high power mode, efficiency, cleaning distance and/or area, cleaning time, operation time, assists called, assists performed, data usage, etc. For example, FIG. 7B includes reporting page 750 summarizing usage of robot 200 in accordance with some implementations of this disclosure.

As illustrated, page 750 has sections 752, 754, and 756. Section 752 can include session summaries. For example, the session summaries can include summary data for pre-determined categories and/or types of data. By way of illustration, for power on times, autonomous mode time, and manual training time can be summarized, including start time, end time, and total duration.

Section 754 can include a total usage breakdown. Section 754 can include summary data from section 752, such as total time usages for the predetermined categories and/or types of data.

Section 756 can include additional summary data. For example, section 756 can include summary data for predetermined categories and/or types of data. By way of illustration, section 756 includes numbers of assists. Emergency assists can include emergencies that robot 200 encountered in which it desired an assist. For example, emergency assists can include getting trapped, collisions and/or near collisions, confusion, delocalization and/or becoming lost, presence of people (e.g., children and/or people), run over and/or potential run over (e.g., running over an object on the ground and/or an area robot 200 should not traverse), harassment (e.g., by people and/or animals), unauthorized actions by people (e.g., unauthorized modification to software and/or hardware), animals and/or interactions with animals, mechanical and/or software failure, replacement of consumables, leakages, etc. Where emergency assists are requested can be predetermined by an operator (e.g., user or computer), robot 200, and/or remote network 302. There can be other assists as well. For example, another category of assists can be non-emergency assists, which can be less urgent than emergency assists in some cases. For example, non-emergency assists can include obstructions (e.g., robot 200 cannot pass, but has to wait), minor interferences, etc. In some cases, some of the examples listed above for emergency assists can be downgraded to non-emergency assists, depending on how much danger is imposed on robot 200 and the navigation of robot 200. Other assist categories are contemplated and can be defined as desirable and/or convenient to users.

Figure 8:
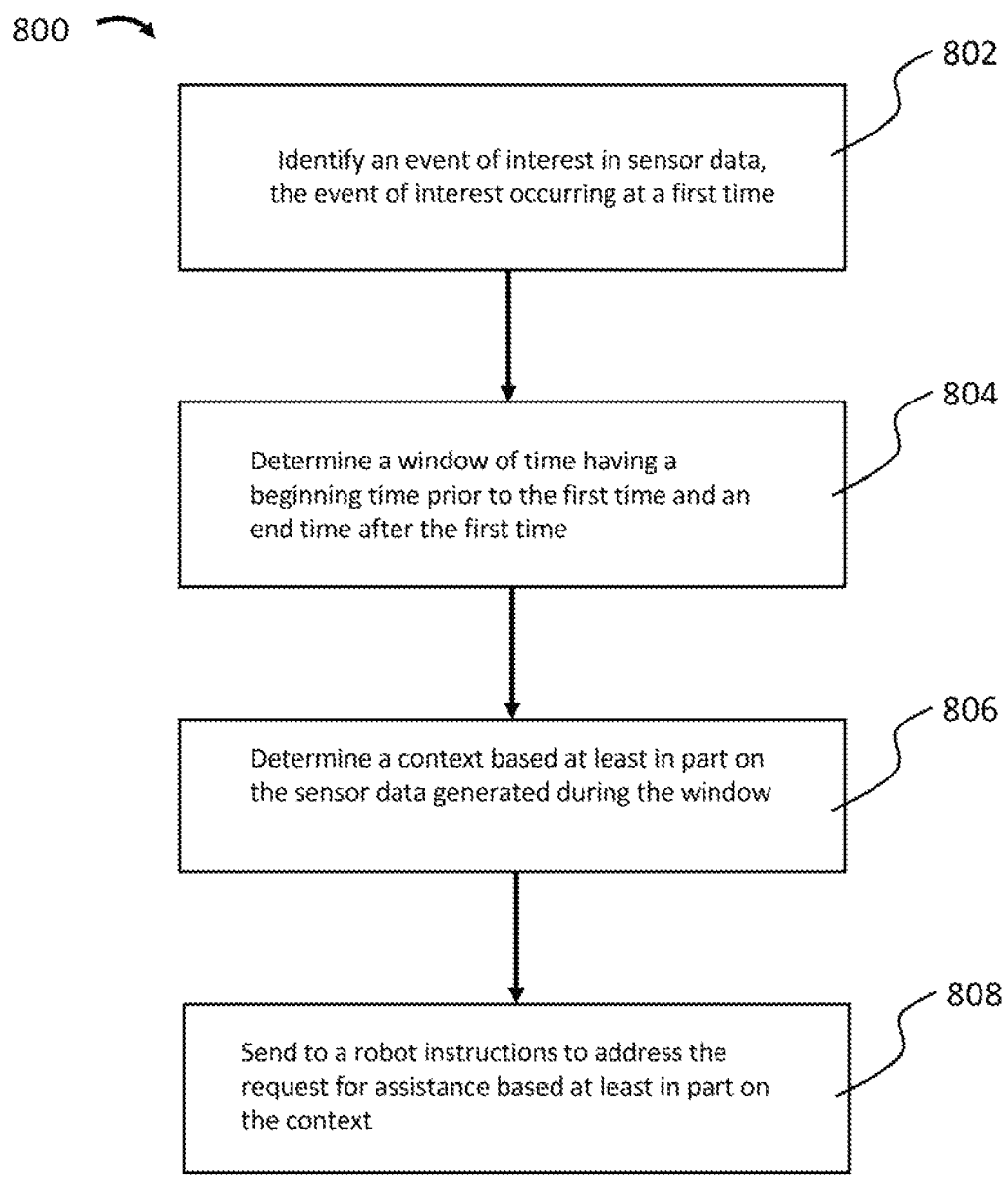
FIG. 8 is a process flow diagram of an exemplary method for operation of a remote network in accordance with some implementations of this disclosure.

FIG. 8 is a process flow diagram of an exemplary method 800 for operation of a remote network in accordance with some implementations of this disclosure. Block 802 includes identifying an event of interest in sensor data, the event of interest occurring at a first time. Block 804 includes determining a window of time having a beginning time prior to the first time and an end time after the first time. Block 806 includes determining a context based at least in part on the sensor data generated during the window. Block 808 includes sending to a robot instructions to address the request for assistance based at least in part on the context.

Figure 9:
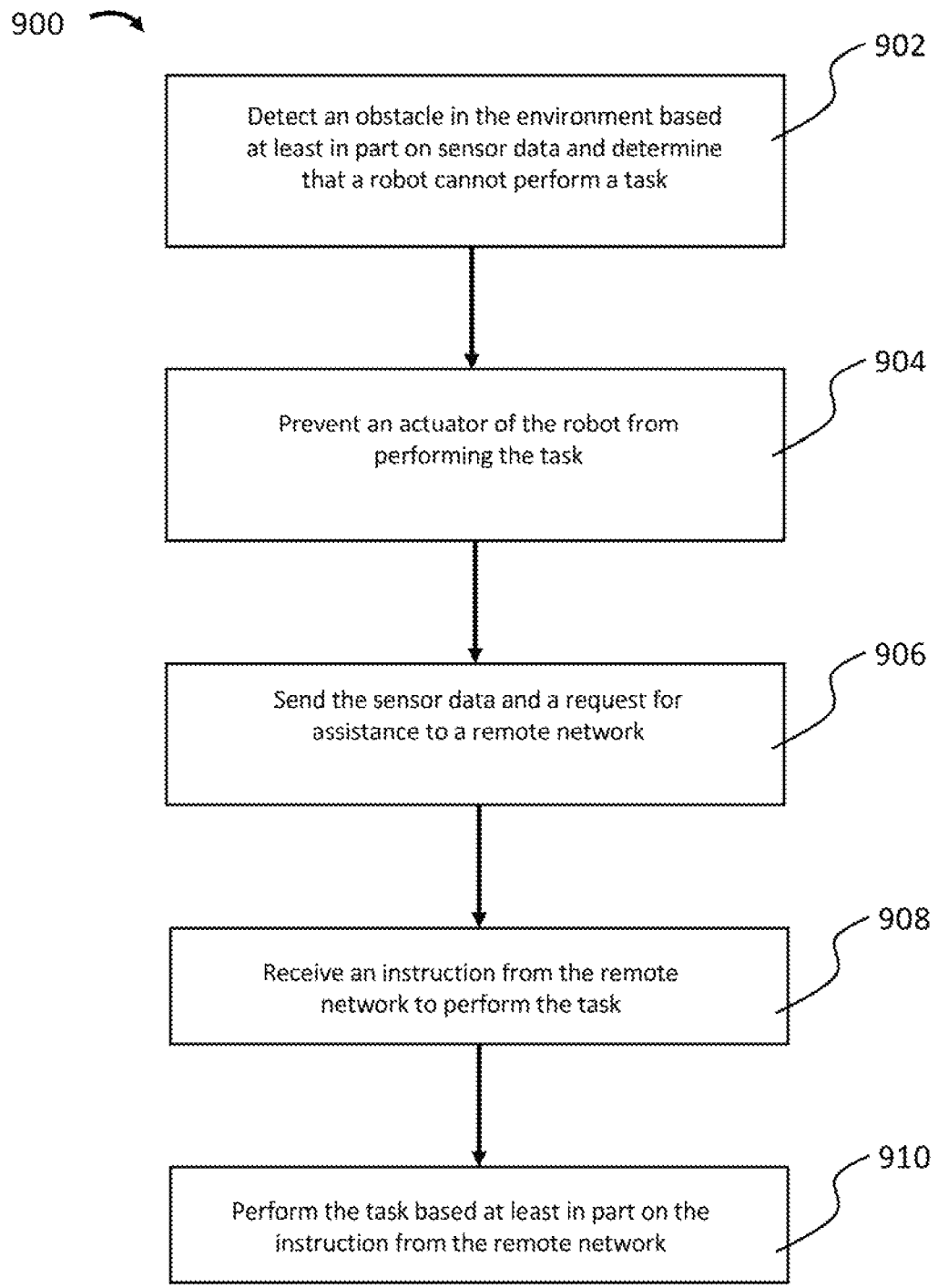
FIG. 9 is a process flow diagram of an exemplary method for operation of a robot in accordance with some implementations of this disclosure.

FIG. 9 is a process flow diagram of an exemplary method 900 for operation of a robot in accordance with some implementations of this disclosure. Block 902 includes detecting an obstacle in the environment based at least in part on sensor data and determine that a robot cannot perform a task. Block 904 includes preventing an actuator of the robot from performing the task. Block 906 includes sending the sensor data and a request for assistance to a remote network. Block 908 includes receiving an instruction from the remote network to perform the task. Block 910 includes performing the task based at least in part on the instructions from the remote network.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software can be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and can be modified as required by the particular application. Certain steps can be rendered unnecessary or optional under certain circumstances. Additionally, certain steps or functionality can be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for remote operating and monitoring a robot, comprising:
    a remote network comprising at least one processor configured to execute computer readable instructions, the at least one processor being coupled to a controller of the robot, the robot comprising a plurality of sensors configured to generate sensor data about an environment, the plurality of sensors including, a first sensor and a different second sensor, the computer readable instructions cause the at least one processor to, receive a first communications to the remote network from the controller of the robot; issue a response from the remote network, the response corresponding to a request by the remote network to receive data from the first sensor and different second sensor of the robot associated with an event of interest wherein the data is collected during a period of time associated with the event, the associated period of time including an opening time and an end time, the opening and end times occurring during the associated period of time to provide a window of time around the time of the event of interest, the amount of time expected to provide context to the event; and receive a second communications to the remote network corresponding to the data from the robot requested by the remote network; wherein the first communication corresponds to an assist event based on a determination by the controller of the robot that the event of interest relates to a need for assistance for the robot.

2. The system of claim 1, wherein the at least one processor of the remote network is further configured to execute computer readable instructions to, receive from the second communications map related data, the map related data comprising at least one of a computer readable map produced during operation of the robot by the controller or data required by the at least one processor to produce a computer readable map; and generate a report based on the map related data, the report details the performance of the robot.

3. The system of claim 2, wherein the report includes at least one of power on/off times of the robot, operation in different modes including at least autonomous and manual modes, cleaning distance, cleaning area, operation time, assists called, and data usage.

4. The system of claim 2, wherein the at least one processor of the remote network is further configured to execute computer readable instructions to, update the computer readable map to produce an updated computer readable map, the update being configured automatically via the at least one processor executing the computer readable instructions or in response to a human providing an input to an access point coupled to the remote network; and communicate the updated computer readable map to the controller of the robot.

5. The system of claim 4, wherein the automatic updates to the computer readable map include the at least one processor of the remote network performing at least one of simultaneous localization and mapping, scale-invariant feature transform, or scan matching using the map related data.

6. The system of claim 2, wherein the report is communicated to an operator of the robot via an email or file transfer.

7. The system of claim 1 wherein the first communications includes an indication that the robot has ceased autonomous operation at a first time; and the second communications includes data from at least one sensor on the robot acquired during a time window surrounding the first time.

8. A method for remote operating and monitoring a robot, comprising:
receiving a first communications to the remote network from a controller of a robot, the robot comprising a plurality of sensors configured to generate sensor data about an environment, the plurality of sensors including a first sensor and a different second sensor, the controller being configured to issue the first communications via executing computer readable instructions; issuing a response from the remote network to the controller of the robot, the response corresponding to a request by the remote network to receive data from the first sensor and different second sensor of the robot associated with an event of interest, wherein the data is collected during a period of time associated with the event, the associated period of time including an opening time and an end time, the opening and end times occurring during the associated period of time to provide a window of time around the time of the event of interest, the amount of time expected to provide context to the event; and receiving a second communications to the remote network from the controller corresponding to the data from the robot requested by the remote network; wherein the first communication corresponds to an assist event based on a determination by the controller of the robot that the event of interest relates to a need for assistance for the robot.

9. The method of claim 8, further comprising:
receiving, from the second communications, map related data, the map related data comprising at least one of a computer readable map produced by the controller during operation of the robot or data from sensors of the robot required by the at least one processor to produce a computer readable map; and generating a report based on the map related data, the report details the performance of the robot.

10. The method of claim 9, wherein the report includes at least one of power on/off times of the robot, operation in different modes including at least autonomous and manual modes, cleaning distance, cleaning area, operation time, assists called, and data usage.

11. The method of claim 9, further comprising:
updating the computer readable map to produce an updated computer readable map, the update being configured automatically via the at least one processor executing the computer readable instructions or in response to a human providing an input to an access point coupled to the remote network; and communicating the updated computer readable map to the controller of the robot.

12. The method of claim 11, wherein the automatic updates to the computer readable map include the at least one processor of the remote network performing at least one of simultaneous localization and mapping, scale-invariant feature transform, or scan matching using the map related data.

13. The method of claim 9, wherein the report is communicated to an operator of the robot via an email or file transfer.

14. The method of claim 8, wherein the first communications includes an indication that the robot has ceased autonomous operation at a first time; and the second communications includes data from at least one sensor on the robot acquired during a time window surrounding the first time.

15. A non-transitory computer readable storage medium comprising a plurality of computer readable instructions thereon which, when executed by at least one processor of a remote network, cause the at least one processor to, receive a first communications to the remote network from a controller of a robot, the robot comprising a plurality of sensors configured to generate sensor data about an environment, the plurality of sensors including a first sensor and a different second sensor, the controller being configured to issue the first communications via executing computer readable instructions; issue a response from the remote network to the controller of the robot, the response corresponding to a request by the remote network to receive data from the first sensor and different second sensor of the robot associated with an event of interest, wherein the data is collected during a period of time associated with the event, the associated period of time including an opening time and an end time, the opening and end times occurring during the associated period of time to provide a window of time around the time of the event of interest, the amount of time expected to provide context to the event; and receive a second communications to the remote network from the controller corresponding to the data from the robot requested by the remote network; wherein the first communication corresponds to an assist event based on a determination by the controller of the robot that the event of interest relates to a need for assistance for the robot.

16. The non-transitory computer readable storage medium of claim 15, wherein the at least one processor is further configured to execute the plurality of computer readable instructions to, receive, from the second communications, map related data, the map related data comprising at least one of a computer readable map produced by the controller during operation of the robot or data from sensors of the robot required by the at least one processor to produce a computer readable map; and generate a report based on the map related data, the report details the performance of the robot.

17. The non-transitory computer readable storage medium of claim 16, wherein the report includes at least one of power on/off times of the robot, operation in different modes including at least an autonomous and manual modes, cleaning distance, cleaning area, operation time, assists called and data usage.

18. The non-transitory computer readable storage medium of claim 16, wherein the at least one processor is further configured to execute the plurality of computer readable instructions to, update the computer readable map to produce an updated computer readable map, the update being configured automatically via the at least one processor executing the computer readable instructions or in response to a human providing an input to an access point coupled to the remote network; and communicate the updated computer readable map to the controller of the robot.

19. The non-transitory computer readable storage medium of claim 18, wherein the automatic updates to the computer readable map include the at least one processor of the remote network performing at least one of simultaneous localization and mapping, scale-invariant feature transform, or scan matching using the map related data.

20. The non-transitory computer readable storage medium of claim 16, wherein the report is communicated to an operator of the robot via an email or file transfer.

* * * * *

UNITED STATES PATENT AND TRADEMARK OFFICE
CERTIFICATE OF CORRECTION

PATENT NO. : 11,602,841 B2
APPLICATION NO. : 16/939779
DATED : March 14, 2023
INVENTOR(S) : Cody Griffin, Roger Unwin and John Black Page 1 of 1

It is certified that error appears in the above-identified patent and that said Letters Patent is hereby corrected as shown below:

In the Claims

1. In Column 30, Lines 44-45, change "wherein the first communication corresponds to an assist event" to --wherein the first communications corresponds to an assist event--.
2. In Column 30, Lines 51-57, change "the map related data comprising at least one of a computer readable map produced during operation of the robot by the controller or data required by the at least one processor to produce a computer readable map; and generate a report based on the map related data, the report details the performance of the robot" to --the second communications map related data comprising at least one of a computer readable map produced during operation of the robot by the controller or data required by the at least one processor to produce a computer readable map; and generate a report based on the second communications map related data, the report details the performance of the robot--.
3. In Column 31, Lines 6-11, change "wherein the automatic updates to the computer readable map include the at least one processor of the remote network performing at least one of simultaneous localization and mapping, scale-invariant feature transform, or scan matching using the map related data" to --wherein the automatic update to the computer readable map include the at least one processor of the remote network performing at least one of simultaneous localization and mapping, scale-invariant feature transform, or scan matching using the second communications map related data--.
4. In Column 31, Line 22, change "receiving a first communications to the remote network" to --receiving a first communications to a remote network--.
5. In Column 31, Lines 53-56, change "robot required by the at least one processor to produce a computer readable map; and generating a report based on the map related data, the report details the performance of the robot" to --robot required by at least one processor to produce a computer readable map; and generating a report based on the map related data, the report details performance of the robot--.
6. In Column 32, Lines 55-56, change "the report details the performance of the robot" to --the report details performance of the robot--.

Signed and Sealed this
Eleventh Day of March, 2025

Coke Morgan Stewart
*Acting Director of the United States Patent and Trademark Office*